US011696332B2

(12) United States Patent
Lei et al.

(10) Patent No.: US 11,696,332 B2
(45) Date of Patent: Jul. 4, 2023

(54) HYBRID RESOURCE MAPPING FOR RAR

(71) Applicant: QUALCOMM Incorporated, San Diego, CA (US)

(72) Inventors: Jing Lei, San Diego, CA (US); Huilin Xu, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 16/987,185

(22) Filed: Aug. 6, 2020

(65) Prior Publication Data

US 2021/0051729 A1 Feb. 18, 2021

Related U.S. Application Data

(60) Provisional application No. 62/888,349, filed on Aug. 16, 2019.

(51) Int. Cl.
*H04W 74/08* (2009.01)
*H04W 4/06* (2009.01)
(Continued)

(52) U.S. Cl.
CPC ....... *H04W 74/0833* (2013.01); *H04L 1/0061* (2013.01); *H04L 5/0048* (2013.01);
(Continued)

(58) Field of Classification Search
CPC . H04W 74/0833; H04W 4/06; H04W 72/042; H04W 72/0406; H04L 1/0061;
(Continued)

(56) References Cited

U.S. PATENT DOCUMENTS

2019/0261431 A1* 8/2019 Tsai ................. H04W 76/11
2021/0329703 A1* 10/2021 Yang ................ H04L 5/001

FOREIGN PATENT DOCUMENTS

EP 3471325 A1 4/2019

OTHER PUBLICATIONS

Liu et al., "Group-DCI Based Scheduling Scheme for Ultra-Reliable and Low Latency Communications," 2017, IEEE Xplore (Year: 2017).*

(Continued)

*Primary Examiner* — Justin T Van Roie
(74) *Attorney, Agent, or Firm* — Haynes and Boone, LLP

(57) ABSTRACT

Wireless communication devices, systems, and methods related to mechanisms to implement improved RAR decoding performance and resource utilization efficiency in a RACH procedure. A PDCCH with common search space encodes a DCI with configuration information that schedules separate PDSCHs for different UEs/UE groups. When sending a RAR message, the PDCCH includes a DCI with a configuration field to signal multiple DMRS resources with corresponding PDSCH. Each sub-field of the configuration field may include one or multiple bits. When one bit per sub-field, the bit is a flag that when asserted leads the UE to blind decode the PDSCH associated with that DMRS resource. When multiple bits, it includes a flag field as well as one or more bits that include least significant bits of a UE identifier (or group identifier). The UE locates its identifier (or group identifier), and limits decoding to that PDSCH with corresponding DMRS resource.

28 Claims, 9 Drawing Sheets

(51) Int. Cl.
*H04L 1/00* (2006.01)
*H04L 5/00* (2006.01)
*H04W 72/23* (2023.01)
*H04L 12/18* (2006.01)

(52) U.S. Cl.
CPC ............ *H04W 4/06* (2013.01); *H04W 72/23* (2023.01); *H04L 12/189* (2013.01)

(58) Field of Classification Search
CPC ... H04L 5/0048; H04L 12/189; H04L 1/0003; H04L 1/0031; H04L 5/0044; H04L 5/0094; H04L 5/0051
See application file for complete search history.

(56) References Cited

OTHER PUBLICATIONS

International Search Report and Written Opinion—PCT/US2020/045509—ISA/EPO—dated Oct. 28, 2020.
Qualcomm Incorporated: "Channel Structure for Two-Step RACH", 3GPP TSG-RAN WG1 Meeting #96Bis, R1-1904992, Channel Structurefor Two-Step RACH, 3rd Generationpartnership Project (3GPP), Mobile Competence Centre; 650, Route Deslucioles; 2D1904992%2Ezip [retrieved on Apr. 7, 2019], Sections 2. F-06921 Sophia-Antipolis Cedex; France, vol. RAN WG1, No. Xi'an, China; Apr. 8, 2019-Apr. 12, 2019, Apr. 7, 2019 (Apr. 7, 2019), pp. 1-11, XP051700107, Retrieved from the Internet: URL: http://www.3gpp.org/ftp/Meetings%5F3GPP%5FSYNC/RANI1/Docs/R1%.

* cited by examiner

HYBRID RESOURCE MAPPING FOR RAR

CROSS REFERENCE TO RELATED APPLICATIONS

The present application claims priority to and the benefit of the U.S. Provisional Patent Application No. 62/888,349, filed Aug. 16, 2019, which is hereby incorporated by reference in its entirety as if fully set forth below in its entirety and for all applicable purposes.

TECHNICAL FIELD

This application relates to wireless communication systems, and more particularly to methods (and associated devices and systems) for improved random access response decoding performance and resource utilization efficiency during a random access procedure by a hybrid resource mapping.

INTRODUCTION

Wireless communications systems are widely deployed to provide various types of communication content such as voice, video, packet data, messaging, broadcast, and so on. These systems may be capable of supporting communication with multiple users by sharing available system resources. A wireless multiple-access communications system may include a number of base stations (BSs), each simultaneously supporting communications for multiple communication devices, which may be otherwise known as user equipment (UE).

A UE may synchronize to a network by performing a random access procedure, including the exchange of a number of messages (e.g., 2 or 4) between the UE and a BS. After the UE transmits a random access message, the UE monitors within a random access response window for a random access response (RAR) message from the BS. In contention-based random access, typically multiple UEs are engaged in a RACH procedure in the same RACH occasion. To send a RAR message to all of the UEs in the RACH occasion, the BS typically takes one of two approaches.

In the first approach, the BS aggregates the RAR messages of multiple UEs into a single physical downlink shared channel (PDSCH) which is scheduled by one physical downlink control channel (PDCCH). The payload size for this single PDSCH is limited, however, by the link budget of a cell-edge UE in the RACH occasion which limits the multiplexing capacity. In the second approach, the RAR message for each UE in the RACH occasion is scheduled individually, which results in a UE in the RACH occasion monitoring multiple PDCCHs and decoding each of the unicast RAR messages. This unnecessarily consumes time/frequency resources.

Thus, there is a need to more efficiently map RAR messages for UEs in a manner that is more efficient at multiplexing within a multicast RAR and more efficient with resource utilization overall.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes receiving, by a user equipment (UE) from a base station (BS), a random access channel (RACH) response message as part of a RACH procedure. The method further includes decoding, by the UE, a physical downlink control channel (PDCCH) of the RACH response message transmitted in a common search space to obtain downlink control information (DCI) from the PDCCH. The method further includes determining, by the UE, a scheduled physical downlink shared channel (PDSCH) from among a plurality of PDSCH channels and a downlink modulation reference signal (DMRS) resource configuration for the UE from among a plurality of DMRS resource configurations in a configuration field of the DCI, each DMRS resource configuration corresponding to a different PDSCH channel from among the plurality of PDSCH channels. The method further includes demodulating, by the UE, the scheduled PDSCH based on the DMRS resource configuration identified by the DCI. The method further includes decoding, by the UE based on the determining, the scheduled PDSCH identified by the DCI to obtain a random access response (RAR) message from the BS.

In an additional aspect of the disclosure, a method of wireless communication includes receiving, by a base station (BS) from a user equipment (UE), a first random access channel (RACH) message as part of a RACH procedure. The method further includes determining, by the BS in response to successfully decoding at least a portion of the first RACH message, a PDSCH channel from among a plurality of PDSCH channels and downlink modulation reference signal (DMRS) resource configuration for the UE. The method further includes including, by the BS, a plurality of DMRS resource configurations including the DMRS resource configuration for the UE in a configuration field of downlink control information (DCI) in a physical downlink control channel (PDCCH), each DMRS resource configuration corresponding to a different PDSCH channel from among the plurality of PDSCH channels. The method further includes including, by the BS, a random access response (RAR) message for the UE in the determined PDSCH channel. The method further includes transmitting, by the BS to the UE, a second RACH message as part of the RACH procedure, the second RACH message comprising the PDCCH and the determined PDSCH channel scheduled by the PDCCH.

In an additional aspect of the disclosure, a user equipment includes a transceiver configured to receive, from a base station (BS), a random access channel (RACH) response message as part of a RACH procedure. The user equipment further includes a processor configured to decode a physical downlink control channel (PDCCH) of the RACH response message transmitted in a common search space to obtain downlink control information (DCI) from the PDCCH; determine a scheduled physical downlink shared channel (PDSCH) from among a plurality of PDSCH channels and a downlink modulation reference signal (DMRS) resource configuration for the user equipment from among a plurality of DMRS resource configurations in a configuration field of the DCI, each DMRS resource configuration corresponding to a different PDSCH channel from among the plurality of PDSCH channels; demodulate the scheduled PDSCH based on the DMRS resource configuration identified by the DCI; and decode, based on the determining, the scheduled PDSCH identified by the DCI to obtain a random access response (RAR) message from the BS.

In an additional aspect of the disclosure, a base station includes a transceiver configured to receive, from a user equipment (UE), a first random access channel (RACH) message as part of a RACH procedure. The base station further includes a processor configured to determine, in response to successfully decoding at least a portion of the first RACH message, a PDSCH channel from among a plurality of PDSCH channels and downlink modulation reference signal (DMRS) resource configuration for the UE; include a plurality of DMRS resource configurations including the DMRS resource configuration for the UE in a configuration field of downlink control information (DCI) in a physical downlink control channel (PDCCH), each DMRS resource configuration corresponding to a different PDSCH channel from among the plurality of PDSCH channels; and include a random access response (RAR) message for the UE in the determined PDSCH channel. The base station further includes wherein the transceiver is further configured to transmit, to the UE, a second RACH message as part of the RACH procedure, the second RACH message comprising the PDCCH and the determined PDSCH channel scheduled by the PDCCH.

In an additional aspect of the disclosure, a non-transitory computer-readable medium is provided having program code recorded thereon, the program code comprising code for causing a user equipment (UE) to receive, from a base station (BS), a random access channel (RACH) response message as part of a RACH procedure. The program code further comprises code for causing the UE to decode a physical downlink control channel (PDCCH) of the RACH response message transmitted in a common search space to obtain downlink control information (DCI) from the PDCCH. The program code further comprises code for causing the UE to determine a scheduled physical downlink shared channel (PDSCH) from among a plurality of PDSCH channels and a downlink modulation reference signal (DMRS) resource configuration for the UE from among a plurality of DMRS resource configurations in a configuration field of the DCI, each DMRS resource configuration corresponding to a different PDSCH channel from among the plurality of PDSCH channels. The program code further comprises code for causing the UE to demodulate the scheduled PDSCH based on the DMRS resource configuration identified by the DCI. The program code further comprises code for causing the UE to decode, based on the determining, the scheduled PDSCH identified by the DCI to obtain a random access response (RAR) message from the BS.

In an additional aspect of the disclosure, a non-transitory computer-readable medium is provided having program code recorded thereon, the program code comprising code for causing a base station (BS) to receive, from a user equipment (UE), a first random access channel (RACH) message as part of a RACH procedure. The program code further comprises code for causing the BS to determine, in response to successfully decoding at least a portion of the first RACH message, a PDSCH channel from among a plurality of PDSCH channels and downlink modulation reference signal (DMRS) resource configuration for the UE. The program code further comprises code for causing the BS to include a plurality of DMRS resource configurations including the DMRS resource configuration for the UE in a configuration field of downlink control information (DCI) in a physical downlink control channel (PDCCH), each DMRS resource configuration corresponding to a different PDSCH channel from among the plurality of PDSCH channels. The program code further comprises code for causing the BS to include a random access response (RAR) message for the UE in the determined PDSCH channel. The program code further comprises code for causing the BS to transmit, to the UE, a second RACH message as part of the RACH procedure, the second RACH message comprising the PDCCH and the determined PDSCH channel scheduled by the PDCCH.

In an additional aspect of the disclosure, a user equipment includes means for receiving, by the user equipment (UE) from a base station (BS), a random access channel (RACH) response message as part of a RACH procedure. The user equipment further includes means for decoding a physical downlink control channel (PDCCH) of the RACH response message transmitted in a common search space to obtain downlink control information (DCI) from the PDCCH. The user equipment further includes means for determining a scheduled physical downlink shared channel (PDSCH) from among a plurality of PDSCH channels and a downlink modulation reference signal (DMRS) resource configuration for the UE from among a plurality of DMRS resource configurations in a configuration field of the DCI, each DMRS resource configuration corresponding to a different PDSCH channel from among the plurality of PDSCH channels. The user equipment further includes means for demodulating the scheduled PDSCH based on the DMRS resource configuration identified by the DCI. The user equipment further includes means for decoding, based on the determining, the scheduled PDSCH identified by the DCI to obtain a random access response (RAR) message from the BS.

In an additional aspect of the disclosure, a base station includes means for receiving, by the base station (BS) from a user equipment (UE), a first random access channel (RACH) message as part of a RACH procedure. The base station further includes means for determining, in response to successfully decoding at least a portion of the first RACH message, a PDSCH channel from among a plurality of PDSCH channels and downlink modulation reference signal (DMRS) resource configuration for the UE. The base station further includes means for including a plurality of DMRS resource configurations including the DMRS resource configuration for the UE in a configuration field of downlink control information (DCI) in a physical downlink control channel (PDCCH), each DMRS resource configuration corresponding to a different PDSCH channel from among the plurality of PDSCH channels. The base station further includes means for including a random access response (RAR) message for the UE in the determined PDSCH channel. The base station further includes means for transmitting, to the UE, a second RACH message as part of the RACH procedure, the second RACH message comprising the PDCCH and the determined PDSCH channel scheduled by the PDCCH.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION

Figure 1:
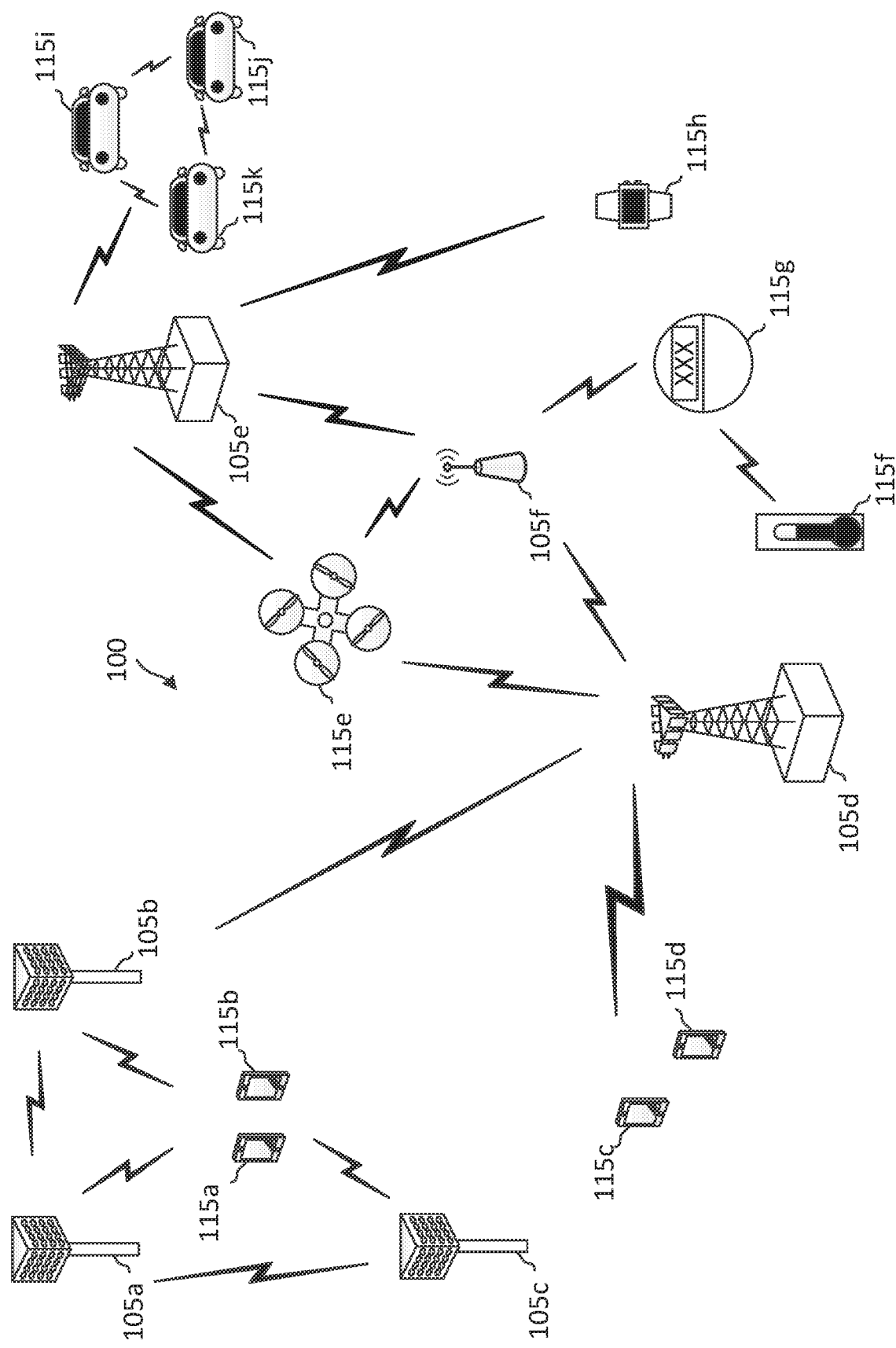
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms to implement improved RAR decoding performance and resource utilization efficiency during a random access procedure by a hybrid resource mapping. The hybrid approach, in particular, combines the use of a group common PDCCH (signaling to multiple UEs with a single PDCCH, i.e. using a common search space) with separate PDSCHs scheduled for different UEs (or groups of UEs), which improves the available payload size for a given PDSCH. Doing so provides more multiplexing capacity in the PDCCH as well, as it is not limited by the payload constraints of the corresponding aggregated PDSCH.

To inform the UEs in an area of the composition of DCI messaging for scheduling RAR messages in PDSCH, a BS transmits system information that includes one or more parameters that describe aspects of a configuration table of a DCI. One parameter identifies a number of DMRS resources with corresponding PDSCH included in the configuration table of the DCI. Another parameter identifies how many bits are associated with each DMRS resource index in the configuration table.

The DCI may include a single-bit flag corresponding to each DMRS resource index. When asserted, it may identify that the DMRS resource is scheduled with the PDSCH for a RAR message. Even where no further bits are associated with each DMRS resource index in the configuration table, UEs experience reduced decoding complexity since they will blind decode only those PDSCHs whose bit for DMRS resource configuration was asserted. Where more bits are associated with each DMRS resource configuration, the additional bits may all be used for including at least the least significant bits of a UE identifier (or UE group identifier, for multicast RAR messages), or alternatively split between multiple bits for the flag for each DMRS resource configuration and LSB for UE identifiers. Where there are multiple bits for a flag field, this may be used to signal an aggregation pattern for a multicast RAR message.

A UE, upon receipt of a RAR message as part of either a msgB (2-step RACH) or message 2 (4-step RACH), will descramble and decode the group common PDCCH. The UE will find the resource configuration information (such as shared time/frequency grid, and DMRS resource configuration) and transmission parameters (such as MCS, TBS, frequency hopping, repetition) for the scheduled PDSCH for the UE for the RAR message payload. The UE, as part of this process, may examine the DMRS resource configuration information signaled in the DCI of PDCCH and, where included, identify a matching or partially matching pattern for its identifier. The UE may further identify any additional configuration parameters in the DCI, such as frequency domain resource assignment, time domain resource assignment (that together specify a common time/frequency grid for a group of 4-step or 2-step RACH UEs sharing the same RACH occasion). With the configuration information, the UE decodes the RAR message from one or multiple PDSCHs transmitted in the common time/frequency grid.

Aspects of the present application provide several benefits. For example, embodiments of the present disclosure enable a UE to decode its RAR message from one or multiple PDSCH transmitted in a common time/frequency grid, with a reduced blind decoding complexity for PDSCH due to the configuration information signaled via DCI. Moreover, the DCI signaling via PDCCH is flexible to accommodate both four-step and two-step RACH procedures, and may be used with UEs in RRC idle/inactive states as well as UEs in RRC connected states, including where only a preamble portion of the RACH message (message 1 in four-step RACH, msgA in two-step RACH) is decoded. The approaches described herein are further applicable to both premium UEs and low-tier UEs. Additional features and benefits of the present disclosure are set forth in the following description.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 may perform a random access procedure to establish a connection with the BS 105. In a four-step random access procedure, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response may be referred to as a message 1 (MSG 1), a message 2 (MSG 2), a message 3 (MSG 3), and a message 4 (MSG 4), respectively. The random access procedure may alternatively be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (msgA). The combined random access response and connection response in the two-step random access procedure may be referred to as a message B (msgB).

After establishing a connection, the UE 115 and the BS 105 can enter an operational state, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In some embodiments, the BS 105 and the UE 115 may employ hybrid resource mapping techniques for random access responses (RAR) during RACH communications to reduce multiplexing limitations and excessive resource utilization. The techniques according to embodiments of the present disclosure include transmitting the PDCCH for a RAR in a common search space for the UE 115 (also referred to herein as the PDCCH being group common). In particular, according to the present disclosure a hybrid is provided between aggregating all UE RAR signaling in a RACH occasion into one PDCCH/PDSCH and scheduling each RAR in a different PDCCH/PDSCH. This is accomplished by utilizing the common search space, i.e., a single PDCCH that aggregates multiple UEs in a RACH occasion, while including improved signaling in the PDCCH to identify different PDSCHs for different UEs or UE sub-groups. In this manner, the link budget for the RAR message in PDSCH is relaxed (due to each UE's RAR payload being scheduled to a different PDSCH), allowing more multiplexing capacity between UEs in the RACH occasion than previously possible.

When the BS 105 broadcasts system information associated with the network (e.g., prior to a RACH procedure by the UE 115, or an updated RACH procedure, etc.), the BS 105 may include one or more parameters that enable the UE 115 to properly decode/interpret the relevant repurposed bits in a DCI on PDCCH in a subsequent RAR message. For example, the BS 105 may include a first parameter that identifies a number of DMRS resources with corresponding PDSCH channels scheduled in a given DCI (in one or more repurposed fields of the DCI, i.e., sub-fields of a configuration field as will be discussed in more detail below). This first parameter may also at times be referred to herein by a variable M for purposes of discussion. The BS 105 may further include a second parameter that identifies how many bits each DMRS resource/PDSCH sub-field (the first parameter, M) includes. This allows the receiving UE 115 to know where the bit boundaries are within the configuration field of the DCI. This second parameter may be referred to at times herein by a variable K for purposes of discussion. Thus, when the UE 115 receives a RAR message during a RACH procedure and begins decoding the PDCCH, the UE 115 may access the configuration field and identify the boundaries in the bits between adjoining DMRS/PDSCH scheduling sub-fields.

In some examples, the configuration field may include a collection of one-bit flags, meaning that K=1 for each sub-field M. The flag may be used to identify whether the DMRS resources for that particular index value is assigned to a PDSCH. For example, a "1" for the flag bit may indicate to the UE 115 decoding the DCI that there is a PDSCH scheduled for transmitting the RAR message, and the PDSCH will be configured with the corresponding DMRS resource. As another example, a "0" for the flag bit may indicate to the UE 115 decoding the DCI that there is no PDSCH using the corresponding DMRS resource associated with that flag bit position in the configuration field. The assertion may be opposite, i.e. a "0" means PDSCH is scheduled and "1" means PDSCH is not.

In some other examples, there may be K>1 bits associated with each sub-field M in the configuration field. In these instances, a first sub-field of a given sub-field M may be used as a flag field, and a second sub-field of the same sub-field M may be used to transmit multiple access signatures for one or more UEs. For example, the first sub-field may still be a one-bit flag as just discussed, with the remaining bits of a given sub-field M belonging to the second sub-field to convey, for example, the least significant bits of a UE or group UE identifier, such as RAPID (random access preamble identifier). As another example, the first sub-field may be allocated multiple bits, such as two, which together are used to indicate an aggregation pattern of RAR on the PDSCH associated with the corresponding DMRS resource signaled by the Mth entry in the configuration field. In this manner, a group of UEs may be scheduled to a particular PDSCH with corresponding DMRS resource for the RAR message.

Figure 5A:
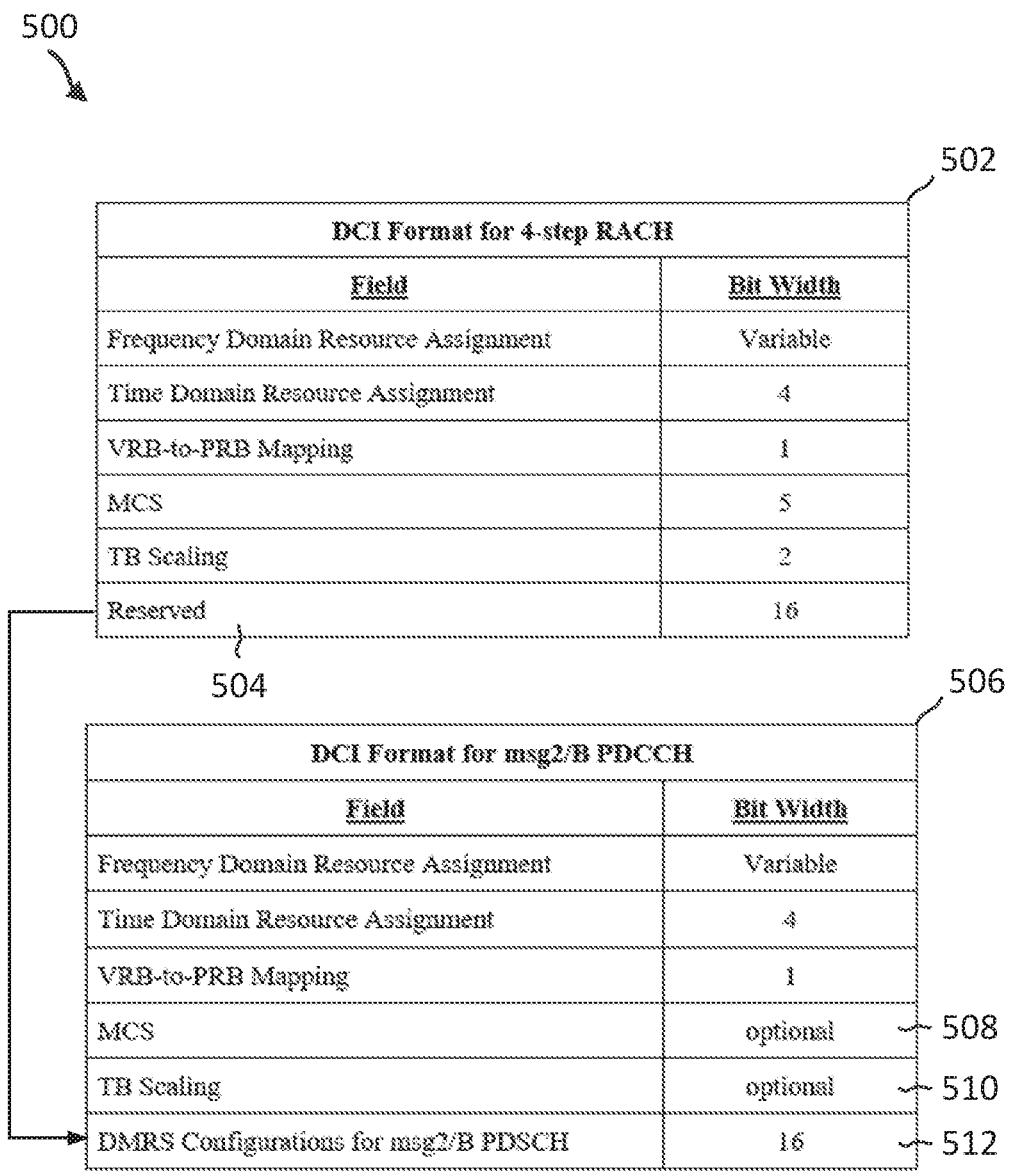
FIG. 5A illustrates a downlink control information format according to some embodiments of the present disclosure.
Figure 5B:
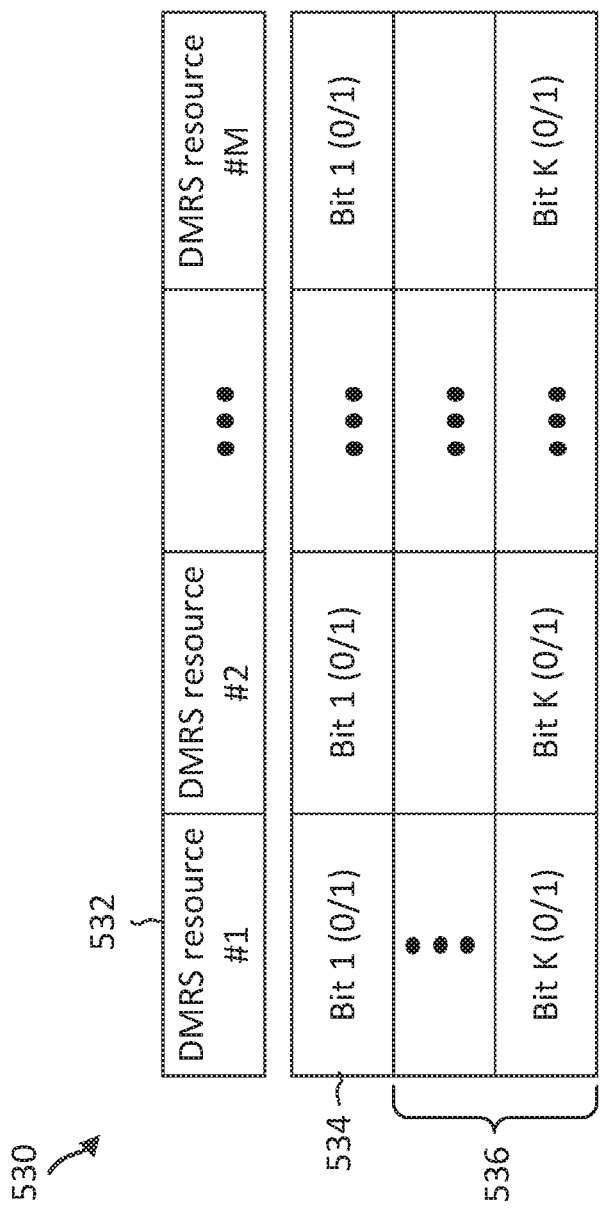
FIG. 5B illustrates a downlink control information format according to some embodiments of the present disclosure.

While the repurposed field(s) of the DCI have been referred to collectively as a configuration field, it may also be considered to be a configuration table with M and K as the dimensions (e.g., as illustrated in FIG. 5B and discussed in more detail below). According to embodiments of the present disclosure, multiple distinct PDSCH may be scheduled by a group common PDCCH, where each PDSCH shares the same time/frequency resources. In this situation, the signals are assigned different spatial patterns (e.g., with different DMRS port assignments) and/or scrambling codes. This provides savings in resource utilization while not limiting the link budget for RAR messaging to multiple UEs in a RACH occasion. In addition, embodiments of the present disclosure may further repurpose one or more other fields of the DCI (e.g., MCS and/or TBS fields) in order to convey one or more transmission parameters such as frequency hopping, slot repetition, number of different TBS multiplexed on the common time/frequency grid, etc.

As a result, embodiments of the present disclosure enable a UE 115 to decode its RAR message from one or multiple PDSCH transmitted in a common time/frequency grid, with a reduced blind decoding complexity for PDSCH due to the configuration information signaled via DCI. Moreover, the DCI signaling via PDCCH is flexible to accommodate both four-step and two-step RACH procedures, and may be used with UEs in RRC idle/inactive states as well as UEs in RRC connected states, including where only a preamble portion of the RACH message (message 1 in four-step RACH, msgA in two-step RACH) is decoded. The approaches described herein are further applicable to both premium UEs and low-tier UEs.

The network 100 may operate over a shared frequency band or an unlicensed frequency band, for example, at about 3.5 gigahertz (GHz), sub-6 GHz or higher frequencies in the mmWave band. The network 100 may partition a frequency band into multiple channels, for example, each occupying about 20 megahertz (MHz). The BSs 105 and the UEs 115 may be operated by multiple network operating entities sharing resources in the shared communication medium and may acquire channel occupancy time (COT) in the share medium for communications. A COT may be non-continuous in time and may refer to an amount of time a wireless node can send frames when it has won contention for the wireless medium. Each COT may include a plurality of transmission slots. A COT may also be referred to as a transmission opportunity (TXOP).

Figure 2A:
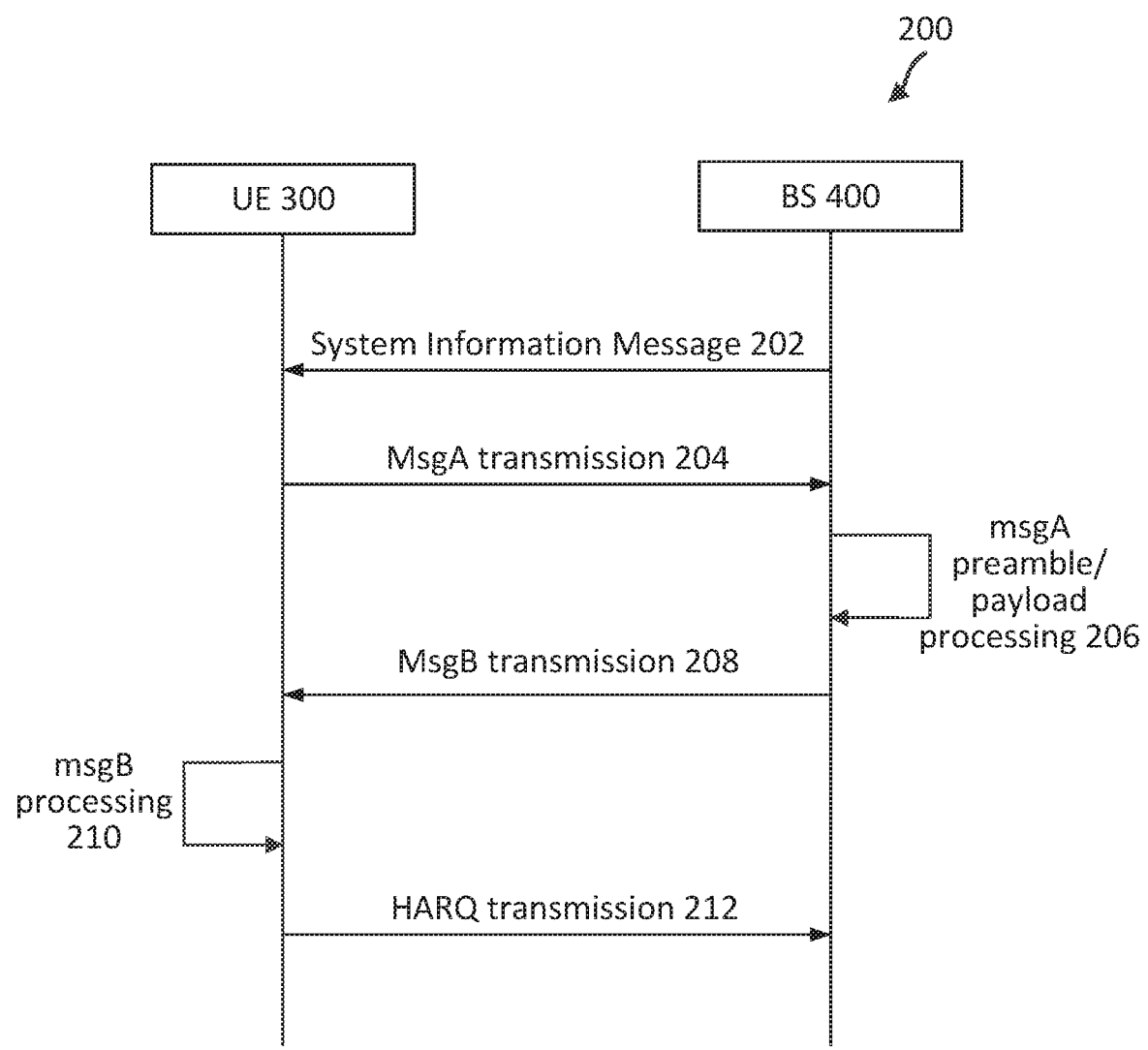
FIG. 2A illustrates a protocol diagram of a wireless communication method according to some embodiments of the present disclosure.

FIG. 2A illustrates a protocol diagram of a wireless communication method 200, particularly a random access procedure 200, between a UE 300 (of which UEs 115 are examples) and a BS 400 (of which BSs 105 are examples) according to some embodiments of the present disclosure. The random access procedure 200 may include a two-step random access procedure, where the UE 300 transmits a random access preamble and a connection request in a single transmission and the BS 400 may respond by transmitting a random access response and a connection response in a single transmission. In the two-step random access procedure, the combined random access preamble and connection request may be referred to as a message A (msgA), while the combined random access response and connection response may be referred to as a message B (msgB).

At action 202, the BS 400 transmits a system information message to the UE 300. The system information message may include configuration field parameters for a DCI in a subsequent PDCCH of a RAR message from the BS 400. For example, the system information message (as relevant to discussion herein—other information is further included in the system information message that is not discussed herein) may include one or more parameters that enable the UE 115 to properly decode/interpret the relevant repurposed bits in a DCI on PDCCH in a subsequent RAR message. A first parameter, M, in the system information message may identify a number of DMRS resources with corresponding PDSCH channels scheduled in a given DCI. A second parameter, K, in the system information message may identify how many bits each DMRS resource/PDSCH sub-field M includes. The system information message may further identify additional fields of the DCI that are repurposed to convey additional transmission parameters for a scheduled PDCCH of a RAR message.

Following transmission of the system information message, the UE 300 may initiate a RACH procedure. This may occur when the UE is any of a variety of RRC states, including for example RRC idle/inactive state, or RRC connected. To do so, at action 204, the UE 300 transmits msgA to the BS 400. As noted above, msgA may include a combination of the random access preamble and connection request (as well as other information, such as a tracking area update, a scheduling request, and a UE identifier).

At action 206, the BS 400 processes the preamble and payload received in the msgA from UE 300 from action 204. As part of this processing, for example, the BS 400 may include PDCCH DCI information that provides resource configuration information (e.g., time/frequency grid, DMRS resource for the corresponding scheduled PDSCH) for the receiving UE 300. In some examples, the BS 400 may not successfully decode the entire msgA from action 204. For example, the BS 400 may successfully decode the msgA preamble but not the msgA payload. In such situations, the BS 400 may generate a FallbackRAR to be carried in the msgB. This may include, for example, at least RAPID, TAC, and TC-RNTI. As another example, where the BS 400 successfully decodes the entire msgA, the BS 400 may generate a SuccessRAR to be carried in the msgB. This may include at least TAC and contention resolution ID for the UE. In addition to the DCI resource configuration information generation/RAR messaging, the BS 400 may further include other information into the msgB including a detected random access preamble ID, TA information, a C-RNTI, a backoff indicator, and a contention resolution.

At action 208, the BS 400 transmits the generated msgB (which includes PDSCH resource configuration information carried in the DCI for the RAR message, together with the RAR message in PDSCH) to the UE 300. For example, the PDCCH of the RAR message may be transmitted in a common search space.

At action 210, the UE 300 receives the msgB from BS 400 and processes the message. This includes, first, decoding the PDCCH. The UE 300 decodes the PDCCH to locate the resource configuration (such as time/frequency grid and DMRS resource) as well as any transmission parameters (if any, such as MCS, TBS, frequency hopping, repetition, etc.) for the msgB PDSCH. The UE 300 locates this information in the DCI generated at action 206. With the configuration information for DMRS and PDSCH indicated in the DCI of the PDCCH, the UE 300 decodes the RAR message from the one or multiple PDSCH transmitted in the common time/frequency grid for which the UE 300 was indicated. For example, the UE 300 may decode multiple PDSCH in embodiments where a one-bit flag is used, or alternatively where the LSB used in remaining bits for a given sub-field could apply to multiple UEs including the UE 300.

At action 212, the UE 300 transmits a HARQ message to the BS 400. This may be an ACK if receipt of msgB was successful, or NACK if unsuccessful.

Figure 2B:
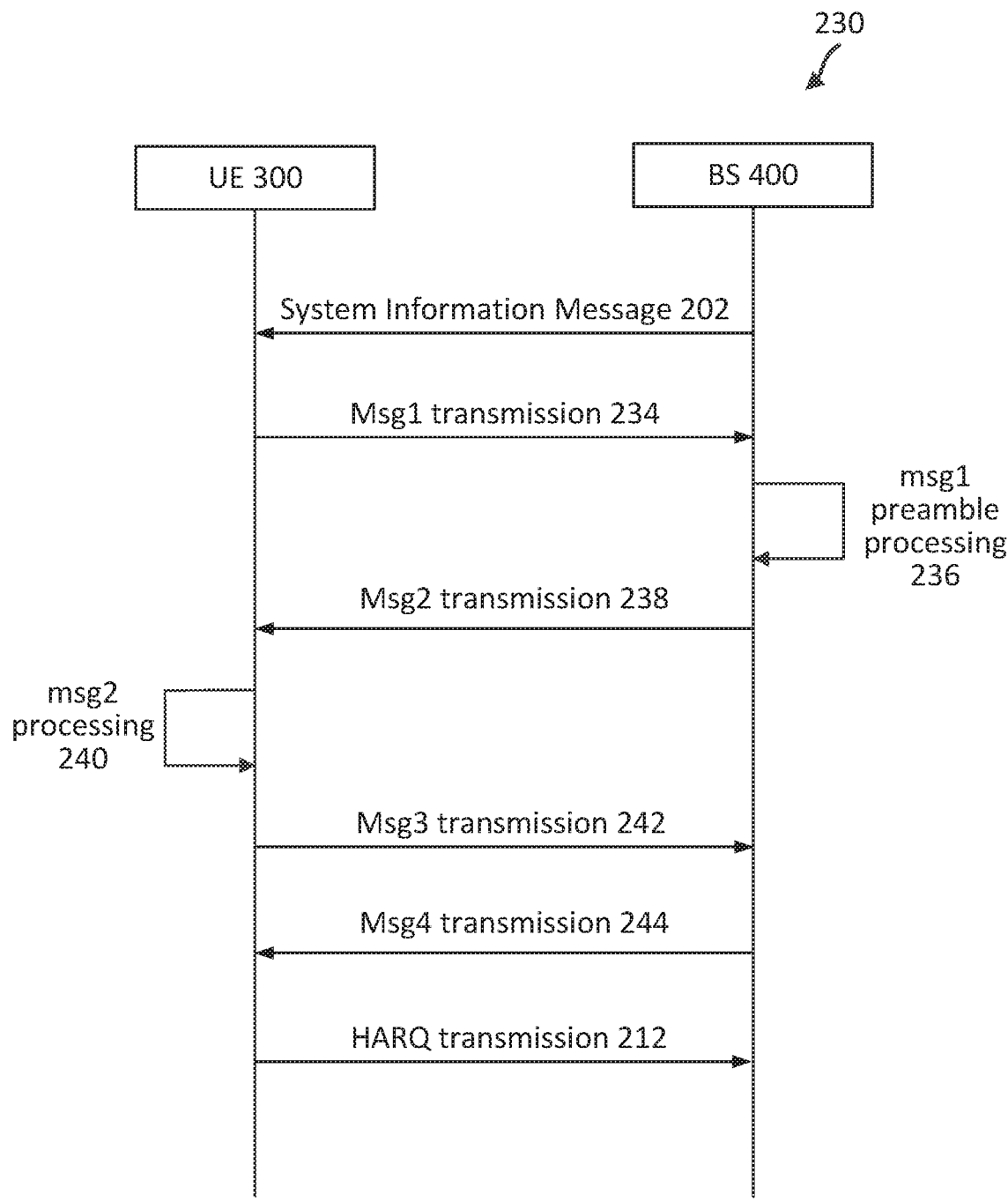
FIG. 2B illustrates a protocol diagram of a wireless communication method according to some embodiments of the present disclosure.

FIG. 2B illustrates a protocol diagram of a wireless communication method 230, particularly a random access procedure 230, between a UE 300 (of which UEs 115 are examples) and a BS 400 (of which BSs 105 are examples) according to some embodiments of the present disclosure. The random access procedure 230 may include a four-step random access procedure, where the UE 300 transmits a random access preamble (message 1) in a separate transmission from a connection request (message 3), and the BS 400 may respond by transmitting a random access response (message 2) in a separate transmission from a connection response (message 4).

At action 202, the BS 400 transmits a system information message to the UE 300 as discussed above with respect to FIG. 2A.

At action 234, the UE 300 initiates a RACH procedure (again, in any of a variety of RRC states according to embodiments of the present disclosure) by transmitting message 1 to BS 400. The message 1 may include a random access preamble as discussed above.

At action 236, the BS 400 processes the preamble received in message 1 from the UE 300 at action 234. The processing at action 236 may include the same or similar aspects as those discussed with respect to action 204 in FIG. 2A, including the generation of PDCCH DCI with the configuration field and optionally other repurposed fields. However, unlike in the two-step RACH procedure, the RAR is not a FallbackRAR or SuccessRAR as may be signaled in the two-step RACH procedure. Instead, the processing includes generating message 2 for transmission back to the UE 300.

At action 238, the BS 400 transmits the generated message 2 (which includes PDSCH resource configuration information carried in the DCI for the RAR message, together with the RAR message in PDSCH) to the UE 300. For example, the PDCCH of the RAR message may be transmitted in a common search space, just as discussed with respect to action 208 of FIG. 2A.

At action 240, the UE 300 processes the received message 2. This includes decoding the PDCCH of message 2 to locate the resource configuration (such as time/frequency grid and DMRS resource) as well as any transmission parameters (if any, such as MCS, TBS, frequency hopping, repetition, etc.) for the message 2 PDSCH. The UE 300 locates this information in the DCI generated at action 236. With the configuration information for DMRS and PDSCH indicated in the DCI of the PDCCH, the UE 300 decodes the RAR message from the one or multiple PDSCH transmitted in the common time/frequency grid for which the UE 300 was indicated. For example, the UE 300 may decode multiple PDSCH in embodiments where a one-bit flag is used, or alternatively where the LSB used in remaining bits for a given sub-field could apply to multiple UEs including the UE 300.

At action 242, the UE 300 transmits a connection request (message 3) to the BS 400.

At action 244, the BS 400 responds to the message 3 connection request with a connection response, i.e. a contention resolution message (message 4) to the UE 300.

At action 212, the UE 300 sends a HARQ message to the BS 400. This may be an ACK if receipt of message 3 was successful, or NACK if unsuccessful, similar to as discussed with respect to FIG. 2A.

Figure 3:
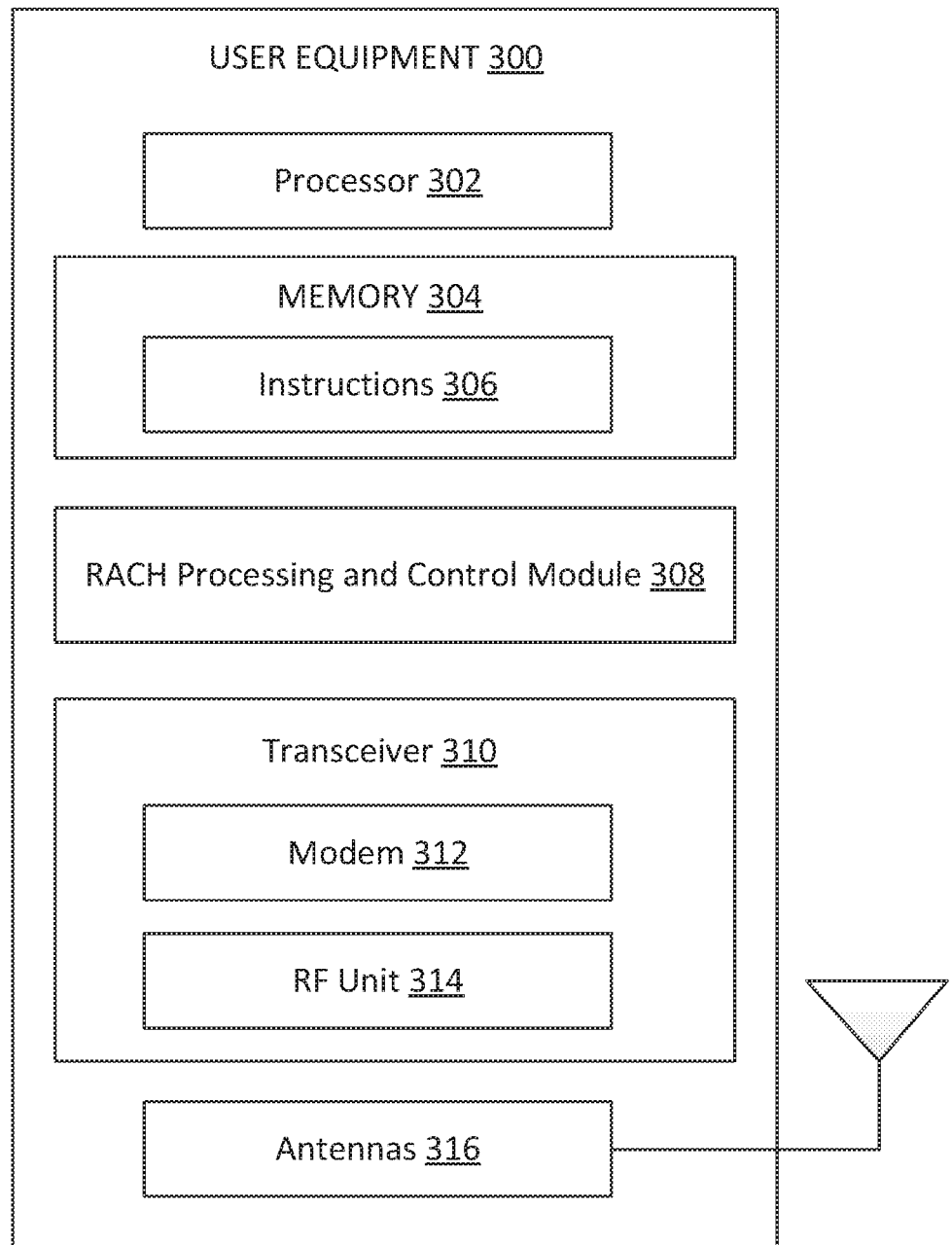
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 discussed above in FIGS. 1 and 2A-2B. As shown, the UE 300 may include a processor 302, a memory 304, a RACH processing and control module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with embodiments of the present disclosure, for example, aspects of FIGS. 1-2B and 5A-7. Instructions 306 may also be referred to as program code. The program code may be for causing a wireless communication device (or specific component(s) of the wireless communication device) to perform these operations, for example by causing one or more processors (such as processor 302) to control or command the wireless communication device (or specific component(s) of the wireless communication device) to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The RACH processing and control module 308 may be implemented via hardware, software, or combinations thereof. For example, RACH processing and control module 308 may be implemented as a processor, circuit, and/or instructions 306 stored in the memory 304 and executed by the processor 302. In some examples, the RACH processing and control module 308 can be integrated within the modem subsystem 312. For example, the RACH processing and control module 308 can be implemented by a combination of software components (e.g., executed by a DSP or a general processor) and hardware components (e.g., logic gates and circuitry) within the modem subsystem 312.

The RACH processing and control module 308 may be used for various aspects of the present disclosure, for example, aspects of FIGS. 1-2B and 5A-7. The RACH processing and control module 308 is configured to communicate with other components of the UE 300 to transmit of one or more RACH messages (e.g., msgA/message 1/message 3), receive one or more RACH messages (e.g., msgB/message 2/message 4), receive and determine PDSCH RAR messaging resource configuration information from system information messaging and group common PDCCH, decode PDSCH RAR messaging, perform HARQ processing on one or more RACH messages, transmit an ACK/NACK for one or more RACH messages, determine whether a timer has expired, start a timer, cancel a timer, stop a timer, determine whether a transmission counter has reached a threshold, reset a transmission counter, restart a random access procedure, trigger RLF, and/or perform other functionalities related to the RACH procedures of a UE described in the present disclosure.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304, and/or the RACH processing and control module 308 according to a modulation and coding scheme (MCS) (e.g., a low-density parity check (LDPC) coding scheme, a turbo coding scheme, a convolutional coding scheme, a digital beamforming scheme, etc.). The RF unit 314 may be configured to process (e.g., perform analog to digital conversion or digital to analog conversion, etc.) modulated/encoded data (e.g., UL data bursts, RRC messages, RACH message(s), ACK/NACKs for DL data bursts) from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 300 to enable the UE 300 to communicate with other devices.

The RF unit 314 may provide the modulated and/or processed data (e.g., data packets or, more generally, data messages that may contain one or more data packets and other information) to the antennas 316 for transmission to one or more other devices. The antennas 316 may further receive data messages transmitted from other devices. The antennas 316 may provide the received data messages for processing and/or demodulation at the transceiver 310. The transceiver 310 may provide the demodulated and decoded data (e.g., system information message(s), RACH message (s) (e.g., msgB/message 2 including PDCCH DCI carrying resource configuration information for PDSCH RAR messaging), DL/UL scheduling grants, DL data bursts, RACH messages, RRC messages, ACK/NACK requests) to the RACH processing and control module 308 for processing. The antennas 316 may include multiple antennas of similar or different designs in order to sustain multiple transmission links. The RF unit 314 may configure the antennas 316.

In an embodiment, the UE 300 can include multiple transceivers 310 implementing different RATs (e.g., NR and LTE). In an embodiment, the UE 300 can include a single transceiver 310 implementing multiple RATs (e.g., NR and LTE). In an embodiment, the transceiver 310 can include various components, where different combinations of components can implement different RATs.

Figure 4:
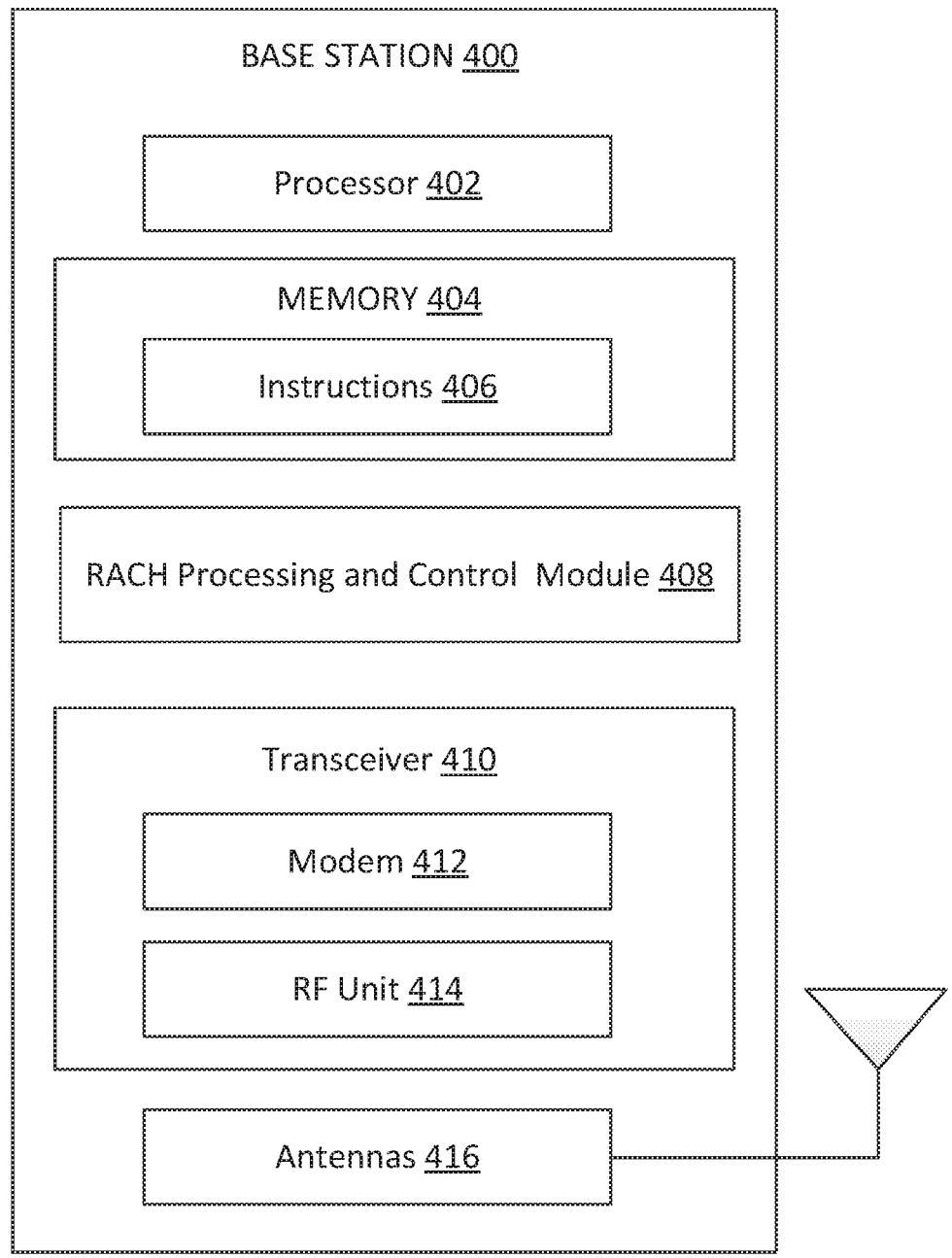
FIG. 4 is a block diagram of an exemplary base station (BS) according to embodiments of the present disclosure.

FIG. 4 is a block diagram of an exemplary BS 400 according to embodiments of the present disclosure. The BS 400 may be a BS 105 as discussed above in FIGS. 1 and 2. As shown, the BS 400 may include a processor 402, a memory 404, a RACH processing and control module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 1-2B and 5A-7. Instructions 406 may also be referred to as code, which may be interpreted broadly to include any type of computer-readable statement(s) as discussed above with respect to FIG. 3.

The RACH processing and control module 408 may be implemented via hardware, software, or combinations thereof. For example, the RACH processing and control module 408 may be implemented as a processor, circuit, and/or instructions 406 stored in the memory 404 and executed by the processor 402. In some examples, the RACH processing and control module 408 can be integrated within the modem subsystem 412. For example, the RACH processing and control module 408 can be implemented by a combination of software components (e.g., executed by a DSP or a general processor) and hardware components (e.g., logic gates and circuitry) within the modem subsystem 412.

The RACH processing and control module 408 may be used for various aspects of the present disclosure, for example, aspects of FIGS. 1-2B and 5A-7. The RACH processing and control module 408 is configured to transmit or retransmit one or more RACH messages having a timing advance (TA) command to a UE (e.g., the UEs 115 and/or 300), receive an ACK/NACK for one or more of the transmitted or retransmitted RACH messages, transmit one or more DL scheduling grants to a UE indicating DL resources (e.g., time-frequency resources), transmit DL data to the UE, transmit one or more UL scheduling grants to the UE indicating UL resources, receive UL data from the UE, etc.

The RACH processing and control module 408 is configured to communicate with other components of the BS 400 to receive of one or more RACH messages, include DCI configuration field parameters into one or more system information messages, include PDCCH DCI resource configuration information into RACH messages (e.g., msgB/message 2), transmit one or more system information messages, transmit one or more RACH messages (e.g., msgB/message 2), perform HARQ processing on one or more RACH messages, receive an ACK/NACK for one or more RACH messages, determine whether a timer has expired, start a timer, cancel a timer, determine whether a transmission counter has reached a threshold, reset a transmission counter, terminate a random access procedure, and/or perform other functionalities related to the RACH procedures of a BS described in the present disclosure.

As shown, the transceiver 410 may include the modem subsystem 412 and the RF unit 414. The transceiver 410 can be configured to communicate bi-directionally with other devices, such as the UEs 115 and/or 300 and/or another core network element. The modem subsystem 412 may be configured to modulate and/or encode data according to a MCS (e.g., a LDPC coding scheme, a turbo coding scheme, a convolutional coding scheme, a digital beamforming scheme, etc.). The RF unit 414 may be configured to process (e.g., perform analog to digital conversion or digital to analog conversion, etc.) modulated/encoded data (e.g., RACH messages (e.g., msgB, etc.) ACK/NACK requests, DL/UL scheduling grants, DL data, RRC messages, etc.) from the modem subsystem 412 (on outbound transmissions) or of transmissions originating from another source, such as a UE 115 or 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 400 to enable the BS 400 to communicate with other devices.

The RF unit 414 may provide the modulated and/or processed data, (e.g., data packets or, more generally, data messages that may contain one or more data packets and other information) to the antennas 416 for transmission to one or more other devices. This may include, for example, transmission of information to complete attachment to a network and communication with a camped UE 115 or 300 according to embodiments of the present disclosure. The antennas 416 may further receive data messages transmitted from other devices and provide the received data messages for processing and/or demodulation at the transceiver 410. The transceiver 410 may provide the demodulated and decoded data (e.g., RACH message(s) (e.g., msgA), ACK/NACKs for RACH message(s) (e.g., ACK/NACK for msgB), UL data, ACK/NACKs for DL data, etc.) to the RACH processing and control module 408 for processing. The antennas 416 may include multiple antennas of similar or different designs in order to sustain multiple transmission links.

In an embodiment, the BS 400 can include multiple transceivers 410 implementing different RATs (e.g., NR and LTE). In an embodiment, the BS 400 can include a single transceiver 410 implementing multiple RATs (e.g., NR and LTE). In an embodiment, the transceiver 410 can include various components, where different combinations of components can implement different RATs.

FIGS. 5A and 5B illustrate different aspects relating to DCI formats to be used in signaling PDSCH resource configuration information via PDCCH (e.g., including appropriate configuration information for DMRS and PDSCH to receive the RAR message from BS 105) in accordance with the present disclosure.

As shown in FIG. 5A, an example DCI format 500 with one or more repurposed fields to convey DMRS resource and PDSCH configuration information to UEs participating in a RACH occasion. For example, FIG. 5A illustrates an existing DCI format 502 used in four-step RACH currently. The DCI format 502 includes a "reserved" field 504, with a total of 16 reserved bits. According to embodiments of the present disclosure, these reserved bits of the DCI format may be repurposed to carry DMRS resource configurations for UEs whose RACH message (msgA or message 1) was successfully (or at least partially successfully for msgA) detected at BS 105. This is illustrated with the transition from field 504 of DCI format 502 to the field 512 in DCI format 506.

In DCI format 506, in addition to the reserved field 504 now repurposed to a DMRS configurations for msg2/B PDSCH field 512 (more simply, a configuration field or PDSCH configuration field), other fields may be repurposed. For example, the MCS field 508 (e.g., up to all 5 bits) as well as the TBS field 510 (up to both bits) may be repurposed (one or both fields) to convey other transmission parameters for PDSCH of RAR messaging, such as frequency hopping, slot repetition, number of different TBS multiplexed on the common time/frequency grid, etc.

As illustrated, the DCI format 506 according to embodiments of the present disclosure may be used in PDCCH of a RAR message for either a four-step RACH procedure's message 2 or a two-step RACH procedure's msgB. For example, for a four-step RACH procedure, the CRC of the PDCCH in message 2 may be masked by RA-RNTI, and for a two-step RACH procedure by msgB-RNTI. The PDSCH, in turn, may be scrambled by a scrambling ID, which may be formed as a function of the multiple access signature for a UE or UE group expecting the RAR message carried by the PDSCH. For example, the scrambling ID may be UE or UE-group specific (e.g., a weighted combination of DMRS resource index, preamble ID used in msgA/message 1, etc.).

Details of the configuration field 512 are illustrated generally in FIG. 5B, which provides a downlink control information format 530 (also referred to as configuration field 530 or configuration table 530) according to some embodiments of the present disclosure. The configuration table 530 of a DCI illustrates resource mapping for a total of M distinct DMRS resources for corresponding PDSCHs (i.e., up to M). As illustrated, there are M columns 532, with each column 532 corresponding to a different DMRS resource number from 1 to M. Each DMRS resource, such as DMRS resource #1, has a matching PDSCH where the RAR message for a unicast UE or multicast UE (part of a group of UEs, as discussed further below).

Further, there is a flag sub-field 534 which is illustrated in FIG. 5B as a row in the configuration table 530. While illustrated as one bit in size, the flag sub-field 534 may alternatively be multiple bits in size for a given DMRS resource number (a given column 532). Finally, a second sub-field 536 is illustrated as occupying multiple rows in the configuration table 530 of FIG. 5B. This may be used, for example, for transmitting a multiple access signature via the DCI corresponding to each DMRS resource for each column 532. Accordingly, the size of the configuration table 530 may be K*M bits, totaling 16 bits in some embodiments according to the configuration field 512 illustrated in FIG. 5A. In some additional embodiments, this total size of the configuration table 530 may be increased by including other optional fields of the DCI, such as fields 508 and/or 510 as illustrated in FIG. 5A.

In one example, the flag sub-field 534 may have a one-bit size for each DMRS column 532. The flag may be used to identify whether the DMRS resources for that particular DMRS column 532 (i.e., DMRS index value) is assigned to a PDSCH. For example, a "1" for the flag bit of a DMRS column 532 may indicate to the UE 115 decoding the DCI that there is a PDSCH scheduled for transmitting the RAR message, and the PDSCH will be configured with the corresponding DMRS resource. As another example, a "0" for the flag bit may indicate to the UE 115 decoding the DCI that there is no PDSCH using the corresponding DMRS resource associated with that flag bit position in the configuration field. The assertion may be opposite, i.e. a "0" means PDSCH is scheduled and "1" means PDSCH is not.

In some examples, the single flag bit for each DMRS column 532 may be the only bit allocated for the DMRS column (i.e., K=1, meaning that only one bit is allocated per DMRS resource configuration field, where K was previously signaled in a system information message as noted with respect to FIGS. 2A/2B above and FIGS. 6/7 below). In such a scenario, where for example the total size of the configuration table 530 is 16 bits, a total of M distinct DMRS resources may be signaled. While no UE identifiers are included in the K=1 example, there are still fewer DMRS ports/corresponding PDSCHs for the UE to blindly decode upon receipt of the RAR message (whether part of msgB or message 2). This aids in reducing the complexity of blind decoding for PDSCH, since the UE 115 does not need to blindly decode every bit it receives anymore, but rather only those portions of PDSCH for which the BS 105 may be signaling a RAR message to the UE 115.

In other examples, K may have a value greater than one, meaning that more than one bit is allocated to each DMRS resource up to the M signaled in a given PDCCH DCI (whether of msgB or message 2). In these examples, the flag sub-field 534 may be allocated one bit or multiple bits. With an allocation of one bit to the flag sub-field 534, the operation would be as discussed above with respect to signaling whether corresponding DMRS resources and PDSCH are scheduled for a RAR message in a RACH occasion.

As another example, the flag sub-field 534 may be allocated multiple bits, such as two, which together are used to indicate an aggregation pattern of RAR on the PDSCH associated with the corresponding DMRS resource signaled by the Mth DMRS column 532 in the configuration table 530. For example, one RAR messaging type may be identified by a first bit pattern, such as 00, a second RAR messaging type by a second bit pattern, and so forth for each different bit pattern. Continuing with the two-bit example, 00 may be assigned to indicate that no PDSCH is scheduled for the corresponding DMRS resource of a given DMRS column 532. As another example, 01 may be assigned to indicate a combination of RAR types (such as FallbackRAR and SuccessRAR) for UEs that meet the criteria based on the result of decoding their msgA/message 1. 10 and 11 may further be assigned to indicate a different combination of RAR types, such as FallbackRAR for bit pattern 10 and SuccessRAR for bit pattern 11. These are by way of example only to illustrate aspects of the present disclosure, and other example assignment may be made.

More generally, while reference to DMRS column 532 may have been made with respect to unicast RAR messaging, embodiments of the present disclosure may associate a group of UEs with a given DMRS resource mapping to a given corresponding PDSCH for a multicast RAR message. For example, different RAR message types may be mapped to different DMRS resource groups, where each DMRS column 532 is a different DMRS resource group. For example, one RAR type may be mapped to even DMRS resources, i.e. DMRS resource groups with an even index number (#2, #4, etc.) in the configuration table 530, and another RAR type may be mapped to odd DMRS resource groups (i.e., with an odd index number such as #1, #3, etc.) in the configuration table 530. One RAR type may be the FallbackRAR and another the SuccessRAR, by way of example.

Such aggregation may be useful, for example, in transmitting multicast RAR messages (RAR messages for a subset of UEs aggregated together). While described with respect to the flag sub-field 534's bits, the aggregation pattern may be indicated (either alternatively or in combination with) by other aspects of the repurposed DCI format 500 such as the MCS field 508 and/or TBS field 510.

In scenarios where there are multiple bits allocated to each DMRS column 532, the total number of M DMRS resources that may be signaled in the given PDCCH's DCI is limited by the number of K bits per DMRS column 532. For example, where K=4, each DMRS column 532 will include 4 bits, such that M=4 (so that (K=4)*(M=4)=16 total bits). The combination of bits in the second sub-field 536 for each DMRS column 532 may be used to signal at least a portion of a UE identifier. For example, the bits in the second sub-field 536 for a given DMRS column 532 may include the least significant bits of a UE identifier, such as RAPID. Thus, this second sub-field may alternatively be referred to as a multiple access signature sub-field.

With configuration information conveyed to the UEs 115 via mapping within a DCI of a group common PDCCH, such as according to the principles illustrated and discussed with respect to the configuration table 530 of FIG. 5B, a receiving UE 115 is able to find resource configuration information (such as time/frequency grid, DMRS resource, etc. for a PDSCH carrying a RAR message) from the group common PDCCH with an improved link budget, while reducing the number of resources that would have otherwise been consumed by individual PDCCHs as well as reducing the complexity of blind decoding for PDSCH based on the additional configuration information for PDSCH signaled via the DCI.

Figure 6:
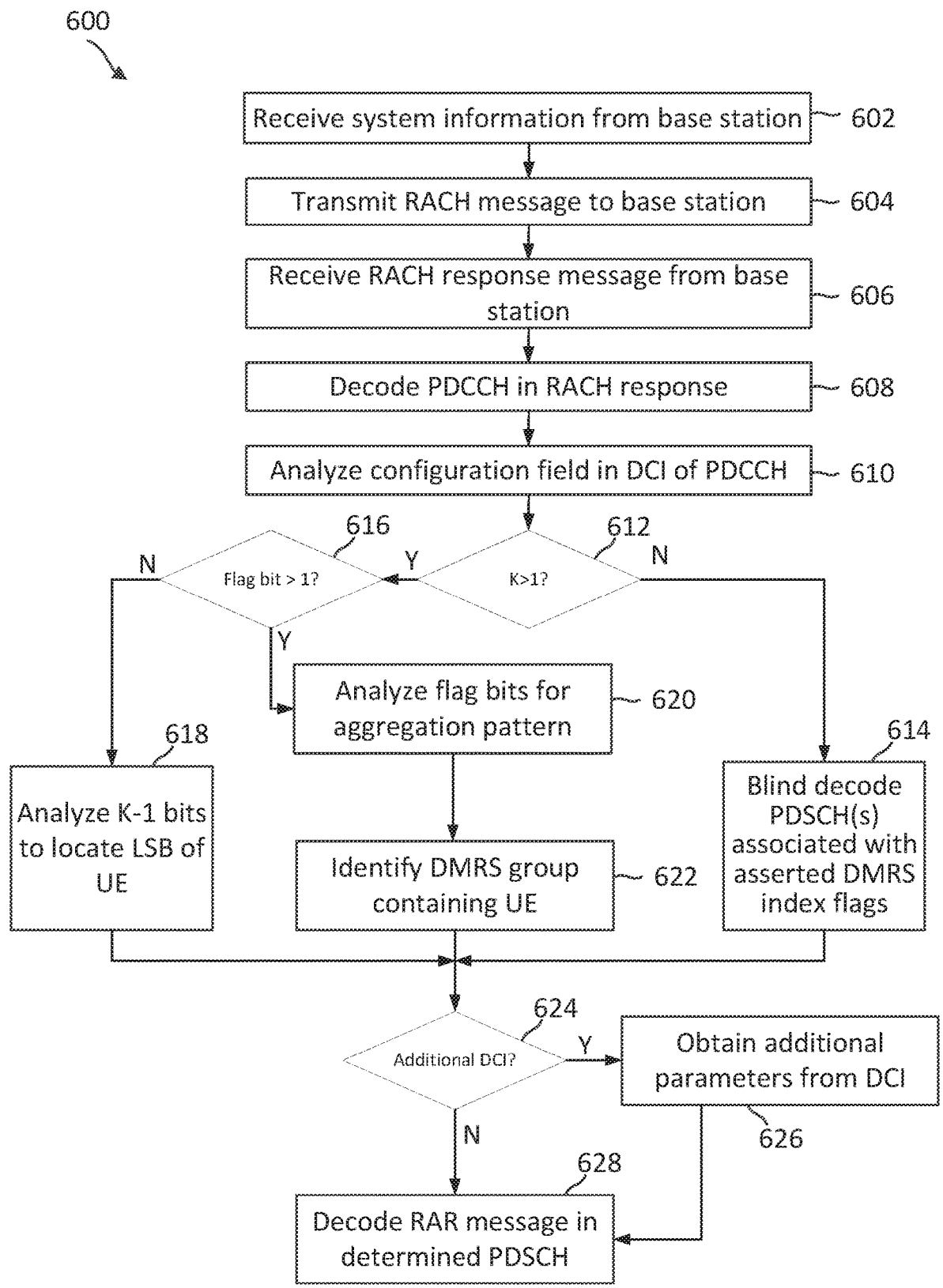
FIG. 6 illustrates a flow diagram of a wireless communication method according to some embodiments of the present disclosure.

FIG. 6 illustrates a flow diagram of a wireless communication method 600 for mapping random access response resources in a hybrid manner, according to some embodiments of the present disclosure. Aspects of the method 600 can be executed by a wireless communication device, such as the UEs 115 and/or 300 utilizing one or more components, such as the processor 302, the memory 304, the RACH communication and processing module 308, the transceiver 310, the modem 312, the one or more antennas 316, and various combinations thereof. As illustrated, the method 600 includes a number of enumerated steps, but embodiments of the method 600 may include additional steps before, during, after, and in between the enumerated steps. For example, in some instances one or more aspects of two-step RACH procedures from FIG. 2A, four-step RACH procedures from FIG. 2B, and/or downlink control information structure from FIGS. 5A-5B may be implemented as part of method 600. Further, in some embodiments, one or more of the enumerated steps may be omitted or performed in a different order.

At block 602, the UE 115 receives system information broadcast from the BS 105. This may occur, for example, prior to a RACH procedure by the UE 115, or an updated RACH procedure, etc.). The system information may include one or more parameters that enable the UE 115 to properly decode/interpret the relevant repurposed bits in a DCI on PDCCH in a subsequent RAR message. For example, the system information may include a first parameter (M) that identifies a number of DMRS resources with corresponding PDSCH channels scheduled in a given DCI (in one or more repurposed fields of the DCI, i.e., sub-fields of a configuration field). The BS 105 may further include a second parameter (K) that identifies how many bits each DMRS resource/PDSCH sub-field (the first parameter, M) includes. This allows the UE 115 to know where the bit boundaries are within the configuration field of the DCI. The system information may identify other DCI fields that have been repurposed to transmit other transmission parameters associated with a PDSCH (or multiple) carrying a RAR message.

At block 604, the UE 115 transmits a RACH message (e.g., msgA or message 1) to the BS 105 as part of a RACH procedure. This may occur when the UE is any of a variety of RRC states, including for example RRC idle/inactive state, or RRC connected.

At block 606, the UE 115 receives a RACH response message (e.g., msgB or message 2) from the BS 105 in response to the RACH message transmitted at block 604. The RACH response message, whether msgB or message 2, includes a PDCCH and PDSCH that the UE 115 decodes.

At block 608, the UE 115 begins by decoding the PDCCH of the RACH response message. In examples where the RACH procedure is a four-step RACH procedure, this includes descrambling a CRC of the PDCCH using a RA-RNTI. In examples where the RACH procedure is a two-step RACH procedure, this includes descrambling a CRC of the PDCCH using a msgB-RNTI. Either way, the UE 115 obtains the DCI in the PDCCH which, according to embodiments of the present disclosure, provides DMRS resource configuration information for corresponding PDSCH that include RAR messages. Each PDSCH may be scheduled by the group common PDCCH, but be individually allocated using different DMRS resources with the same time/frequency grid.

At block 610, the UE 115 analyzes the DMRS configuration field from the DCI of the PDCCH obtained at block 608, including for example identifying the boundaries between different DMRS configurations (i.e., between M different DMRS configurations) according to the M and K values obtained from system information at block 602.

At decision block 612, if K is not greater than 1, then each of the M DMRS configurations includes only a flag bit. The method 600 proceeds, in this situation, to block 614.

At block 614, the UE 115 blind decodes any PDSCH(s) that are associated with asserted flags from among the M DMRS configurations included in the DCI's configuration field of the group common PDCCH. In this manner, the complexity and/or processing burden of blind decoding is reduced by limiting to only those corresponding PDSCH(s) corresponding to DMRS resources that were asserted by a mapped flag bit.

Returning to decision block 612, if K is greater than 1, meaning that there are multiple bits assigned to each of the M different DMRS configurations signaled in a given PDCCH, then the method 600 proceeds to decision block 616.

At decision block 616, if the number of K bits for a given DMRS configuration allocated for a flag sub-field (e.g., flag sub-field 534 illustrated in FIG. 5B) is not greater than 1, then the method 600 proceeds to block 618. This corresponds to the flag sub-field identifying which DMRS resources are scheduled for a corresponding PDSCH, with the remaining K bits used to identify other aspects such as UE identity (or a subset of UE identity).

At block 618, the UE 115 analyzes the K−1 bits (the K bits less the one flag bit) to locate the LSB of the UE. This is identified in FIG. 5B as the bits associated with second sub-field 536 for a given DMRS column 532. For example, the bits in this field may include the least significant bits of a UE identifier (e.g., a multiple access signature), such as RAPID.

Returning to decision block 616, if the number of K bits for a given DMRS configuration allocated for a flag sub-field is greater than 1, then the method 600 instead proceeds to block 620.

At block 620, the UE 115 analyzes the bits in the flag sub-field to determine an aggregation pattern of RAR messaging on the PDSCH corresponding to a given DMRS resource configuration allocated for a given PDSCH. For example, one RAR messaging type may be identified by a first bit pattern, a second RAR messaging type by a second bit pattern, and so forth for each different bit pattern through the number of distinct patterns possible with the number of bits in the flag sub-field. Thus, embodiments of the present disclosure may associate a group of UEs with a given DMRS resource mapping to a given corresponding PDSCH for a multicast RAR message.

At block 622, the UE 115 identifies the DMRS group to which the RAR type including the UE 115 is mapped to. For example, where the UE 115 used two-step RACH, the BS 105's RAR may be a FallbackRAR or SuccessRAR, and the UE 115 will be grouped to a DMRS resource configuration (group) based on the RAR type and, in some embodiments, also based on some aspect of the UE 115's identifier (such as even/odd LSBs, etc.).

From any of blocks 614, 618, and 622, the method 600 proceeds to decision block 624 once the relevant DMRS resource configuration (and assignment to a given PDSCH) is determined. At decision block 624, if the DCI in PDCCH had additional transmission parameters signaled in other, repurposed fields of the DCI (see, e.g., FIG. 5A), then the method 600 proceeds to block 626.

At block 626, the UE 115 obtains the additional transmission parameter(s) signaled in the other, repurposed DCI fields (such as MCS and TBS fields). The method 600 then proceeds to block 628.

Returning to decision block 624, if there are no other transmission parameters added, then the method 600 proceeds to block 628.

At block 628, the UE 115 demodulates, descrambles, and decodes the PDSCH identified from the DMRS configuration information in the PDCCH's DCI. For example, the coded bits of the PDSCH are descrambled by a scrambling ID. The scrambling ID may be formed as a function of the multiple access signature for a UE or UE group expecting the RAR message carried by the PDSCH. For example, the scrambling ID may be UE or UE-group specific (e.g., a weighted combination of DMRS resource index, preamble ID used in msgA/message 1, etc.).

Figure 7:
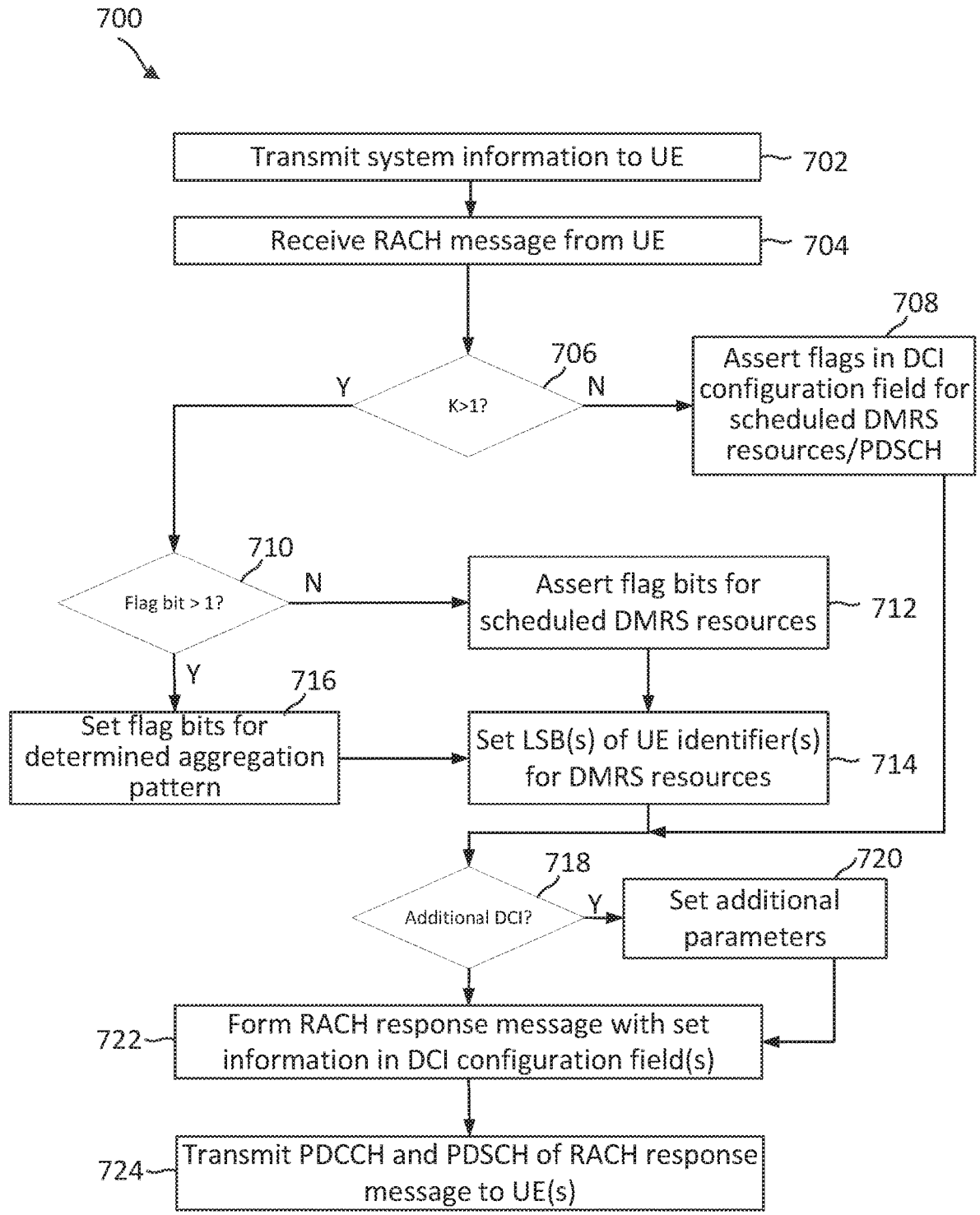
FIG. 7 illustrates a flow diagram of a wireless communication method according to some embodiments of the present disclosure.

FIG. 7 illustrates a flow diagram of a wireless communication method 700 for mapping random access response resources in a hybrid manner according to some embodiments of the present disclosure. Aspects of the method 700 can be executed by a wireless communication device, such as the BSs 105 and/or 400 utilizing one or more components, such as the processor 402, the memory 404, the RACH communication and processing module 408, the transceiver 410, the modem 412, the one or more antennas 416, and various combinations thereof. As illustrated, the method 700 includes a number of enumerated steps, but embodiments of the method 700 may include additional steps before, after, and in between the enumerated steps. For example, in some instances one or more aspects of two-step RACH procedures from FIG. 2A, four-step RACH procedures from FIG. 2B, and/or downlink control information structure from FIGS. 5A-5B may be implemented as part of method 700. In some embodiments, one or more of the enumerated steps may be omitted or performed in a different order.

At block 702, the BS 105 transmits system information to a UE 115 (e.g., broadcast to multiple UEs 115, but described with respect to a single UE 115 for sake of simplicity of discussion here). As noted at block 602 of FIG. 6, the system information may include one or more parameters that enable the UE 115 to properly decode/interpret the relevant repurposed bits in a DCI on PDCCH in a subsequent RAR message, including M and K (and any other parameters when included).

At block 704, the BS 105 receives a RACH message (e.g., msgA or message 1) from the UE 115 as part of a RACH procedure. This may occur when the UE is any of a variety of RRC states, including for example RRC idle/inactive state, or RRC connected. The BS 105 decodes and processes the RACH message, such as discussed above with respect to action 206 (FIG. 2A, two-step RACH) or action 236 (FIG. 2B, four-step RACH). The BS 105 will proceed with generating a RACH response message (msgB or message 2, if two-step RACH or four-step RACH respectively).

At decision block 706, if the BS 105 has identified K to not be greater than one in the system information, then the method 700 proceeds to block 708. If K is not greater than 1, then each of the M DMRS configurations includes only a flag bit.

At block 708, the BS 105 asserts flag bits in a DCI configuration field for any DMRS configurations that are assigned to a PDSCH for the RAR message. Thus, looking at the example table of FIG. 5B, were DMRS resources #1 and #M the only ones assigned to a PDSCH for the RAR messaging (for one or more UEs), the BS 105 may assert flags in the flag sub-field 534 for just those columns in the configuration table 530. Because K is not greater than 1 in this example, there would not be any other bits associated with any of the M entries that would be set. Method 700 proceeds from block 708 to decision block 718, as discussed further below.

Returning to decision block 706, if K is greater than 1, it means that there are multiple bits assigned to each of the M different DMRS configurations signaled in the DCI of a group common PDCCH. In this event, the method 700 proceeds to block decision block 710.

At decision block 710, if the number from K bits for a given DMRS configuration allocated for a flag sub-field (e.g., flag sub-field 534 illustrated in FIG. 5B) is not greater than 1, then the method 700 proceeds to block 718. As noted with respect to FIG. 6, this corresponds to the flag sub-field identifying which DMRS resources are scheduled for a corresponding PDSCH, with the remaining K bits used to identify other aspects such as UE identity (or a subset of UE identity).

At block 712, the BS 105 asserts flag bits in a DCI configuration field for any DMRS configurations that are assigned to a PDSCH for the RAR message, just as was discussed with respect to block 708 above. However, unlike at block 708, there are more bits (K−1) allocated to a given DMRS configuration M, so the method 700 proceeds to block 714.

At block 714, the BS 105 sets the least significant bits of a UE identifier (e.g., a multiple access signature), such as RAPID, for the UE 115 for which the DMRS resources are configured. While noted as the LSB, other bit combinations could be used including the entire identifier (where space allows), the MSB instead, etc., without departing from the scope of the present disclosure.

Returning to decision block 710, if the number from K bits for a given DMRS configuration allocated for a flag sub-field is greater than 1, then the method 700 proceeds to block 716.

At block 716, the BS 105 determines an aggregation pattern for the respective DMRS configurations (up to M) to be included in the configuration field of the DCI to be transmitted via PDCCH to the UE 115. This may involve aggregation of the UE 115 with other UEs 115 in a RACH occasion into a group based on one or more properties of the UEs 115, including for example a RAR message type, some or all of the UE's identifier, etc.

From block 716, the method proceeds to block 714 which functions as just described. From block 714, in the which the configuration the method 700 proceeds to decision block 178.

At decision block 718, if there are additional transmission parameters to include into other fields of the DCI of the group common PDCCH, then the method 700 proceeds to block 720.

At block 720, the BS 105 sets (e.g., encodes) the additional one or more transmission parameters into the relevant repurposed DCI fields (such as MCS and TBS fields). The method 700 proceeds from block 720 to block 722 as discussed below.

Returning to decision block 718, if there are no additional transmission parameters to include into repurposed DCI fields, then the method 700 proceeds to block 722.

At block 722, the BS 105 forms a RACH response message (whether msgB or message 2) with the DMRS configuration information set into the DCI configuration field (whether unicast or multicast, single flag bit or multiple bits per DMRS configuration, etc.).

At block 724, the BS 105 transmits the PDCCH with configuration information in DCI together with the scheduled PDSCH(s) as the RACH response message (msgB or message 2) to the UE(s) in the RACH occasion that are awaiting such a message.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a non-transitory computer-readable medium having program code recorded thereon, the program code comprising code for causing a user equipment (UE) to receive, from a base station (BS), a random access channel (RACH) response message as part of a RACH procedure; code for causing the UE to decode a physical downlink control channel (PDCCH) of the RACH response message transmitted in a common search space to obtain downlink control information (DCI) from the PDCCH; code for causing the UE to determine a scheduled physical downlink shared channel (PDSCH) from among a plurality of PDSCH channels and a downlink modulation reference signal (DMRS) resource configuration for the UE from among a plurality of DMRS resource configurations in a configuration field of the DCI, each DMRS resource configuration corresponding to a different PDSCH channel from among the plurality of PDSCH channels; code for causing the UE to demodulate the scheduled PDSCH based on the DMRS resource configuration identified by the DCI; and code for causing the UE to decode, based on the determining, the scheduled PDSCH identified by the DCI to obtain a random access response (RAR) message from the BS.

The non-transitory computer-readable medium may also include code for causing the UE to receive, from the BS before the RACH response message, a system information message comprising a first amount corresponding to a specified number of DMRS resource configurations, and a second amount corresponding to a number of bits for each DMRS resource configuration, in the configuration field of the DCI. The non-transitory computer-readable medium may also include code for causing the UE to interpret each consecutive bit in the configuration field of the DCI as a distinct flag bit for a different DMRS resource based on the second amount being less than a threshold. The non-transitory computer-readable medium may also include code for causing the UE to decode each scheduled PDSCH with corresponding distinct flag asserted in the configuration field until decoding the scheduled PDSCH for the UE; and code for causing the UE to ignore each PDSCH with corresponding distinct flag left unasserted in the configuration field. The non-transitory computer-readable medium may also include code for causing the UE to interpret, based on the second amount being greater than a threshold, the number of bits for each DMRS resource configuration as including a first field with one or more bits comprising a flag associated with a scheduling status of a corresponding PDSCH channel; and code for causing the UE to interpret a second field with one or more bits as comprising a multiple access signature for one or more UEs, including the UE, whose RAR message is associated with the corresponding PDSCH channel of each DMRS resource configuration. The non-transitory computer-readable medium may also include wherein the second field is a function of the multiple access signature, comprising one or more least significant bits of an identifier of the UE. The non-transitory computer-readable medium may also include wherein the first field comprises an aggregation pattern for a plurality of UEs including the UE receiving corresponding RAR messages in the scheduled PDSCH. The non-transitory computer-readable medium may also include wherein the scheduled PDSCH comprises a unicast RAR message for the UE, the code further comprising code for causing the UE to descramble the RAR message with a UE-specific signature. The non-transitory computer-readable medium may also include wherein the scheduled PDSCH comprises a multicast RAR message for a plurality of UEs including the UE, the code further comprising code for causing the UE to descramble the multicast RAR message with a temporary group identifier; and code for causing the UE to locate the RAR message for the UE from among a plurality of UE-specific RAR messages multiplexed in the multicast RAR message. The non-transitory computer-readable medium may also include wherein the RACH procedure comprises a four-step RACH procedure and the RACH response message comprises message 2 based on the BS having received message 1 from the UE. The non-transitory computer-readable medium may also include code for causing the UE to descramble a cyclic redundancy check (CRC) of the PDCCH with a random access radio network temporary identifier (RA-RNTI). The non-transitory computer-readable medium may also include wherein the RACH procedure comprises a two-step RACH procedure and the RACH response message comprises message B based on the BS having detected one or both of a preamble and a payload from message A from the UE. The non-transitory computer-readable medium may also include code for causing the UE to descramble a cyclic redundancy check (CRC) of the PDCCH with a message B radio network temporary identifier (msgB-RNTI). The non-transitory computer-readable medium may also include wherein the code for causing the decoding further comprises code for causing the UE to obtain, from the scheduled PDSCH, a first RAR message type as the RAR message based on the BS detecting the preamble from message A, the first RAR message type comprising a PUSCH grant; and code for causing the UE to obtain, from the scheduled PDSCH, a second RAR message type as the RAR message based on the BS detecting the preamble and the payload from message A. The non-transitory computer-readable medium may also include code for causing the UE to transmit, using the PUSCH grant, the payload to the BS based on obtaining the first RAR message type, wherein the RACH procedure comprises a four-step RACH procedure. The non-transitory computer-readable medium may also include code for causing the UE to retransmit, using the PUSCH grant, the payload to the BS based on obtaining the first RAR message type, wherein the RACH procedure comprises a two-step RACH procedure. The non-transitory computer-readable medium may also include code for causing the UE to determine a transmission parameter from a repurposed field of the DCI separate from the configuration field. The non-transitory computer-readable medium may also include wherein the code for causing the receiving the RACH response message further comprises code for causing the UE to receive the scheduled PDSCH on a time/frequency grid common to the plurality of PDSCH channels and scheduled by the PDCCH.

Further embodiments of the present disclosure include a non-transitory computer-readable medium having program code recorded thereon, the program code comprising code for causing a base station (BS) to receive, from a user equipment (UE), a first random access channel (RACH) message as part of a RACH procedure; code for causing the BS to determine, in response to successfully decoding at least a portion of the first RACH message, a PDSCH channel from among a plurality of PDSCH channels and downlink modulation reference signal (DMRS) resource configuration for the UE; code for causing the BS to include a plurality of DMRS resource configurations including the DMRS resource configuration for the UE in a configuration field of downlink control information (DCI) in a physical downlink control channel (PDCCH), each DMRS resource configuration corresponding to a different PDSCH channel from among the plurality of PDSCH channels; code for causing the BS to include a random access response (RAR) message for the UE in the determined PDSCH channel; and code for causing the BS to transmit, to the UE, a second RACH message as part of the RACH procedure, the second RACH message comprising the PDCCH and the determined PDSCH channel scheduled by the PDCCH.

The non-transitory computer-readable medium may also include wherein the code for causing the determining further comprises code for causing the BS to determine type for the RAR message, a multiplexing pattern with multiple UEs including the UE, a scrambling identifier for the RAR message; and code for causing the BS to scramble the determined PDSCH channel with the scrambling identifier. The non-transitory computer-readable medium may also include wherein the scheduled PDSCH is on a time/frequency grid common to the plurality of PDSCH channels and scheduled by the PDCCH. The non-transitory computer-readable medium may also include code for causing the BS to send, before the first RACH message, a system information message comprising a first amount corresponding to a specified number of DMRS resource configurations, and a second amount corresponding to a number of bits for each DMRS resource configuration, in the configuration field of the DCI. The non-transitory computer-readable medium may also include code for causing the BS to configure each consecutive bit in the configuration field as a distinct flag for a different DMRS resource based on the second amount being set to less than a threshold. The non-transitory computer-readable medium may also include code for causing the BS to configure, based on the second amount being greater than a threshold, the number of bits for each DMRS resource configuration to include a first field with one or more bits comprising a flag associated with a scheduling state of a corresponding PDSCH channel; and code for causing the BS to configure a second field to include one or more bits comprising a multiple access signature for one or more UEs, including the UE, whose RAR message is associated with the corresponding PDSCH channel of each DMRS resource configuration. The non-transitory computer-readable medium may also include wherein the second field is a function of the multiple access signature, comprising one or more least significant bits of an identifier of the UE. The non-transitory computer-readable medium may also include wherein the first field comprises an aggregation pattern for a plurality of UEs including the UE receiving corresponding RAR messages in the scheduled PDSCH. The non-transitory computer-readable medium may also include wherein the scheduled PDSCH comprises a unicast RAR message for the UE, the code further comprising code for causing the BS to scramble the RAR message with a UE-specific signature. The non-transitory computer-readable medium may also include wherein the scheduled PDSCH comprises a multicast RAR message for a plurality of UEs including the UE, the code further comprising code for causing the BS to place the RAR message for the UE within a plurality of UE-specific RAR messages multiplexed in the multicast RAR message; and code for causing the BS to scramble the multicast RAR message with a temporary group identifier. The non-transitory computer-readable medium may also include wherein the RACH procedure comprises a four-step RACH procedure and the RACH response message comprises message 2 based on the BS having received message 1 from the UE. The non-transitory computer-readable medium may also include code for causing the BS to scramble a cyclic redundancy check (CRC) of the PDCCH with a random access radio network temporary identifier (RA-RNTI). The non-transitory computer-readable medium may also include wherein the RACH procedure comprises a two-step RACH procedure and the RACH response message comprises message B based on the BS having detected one or both of a preamble and a payload from message A from the UE. The non-transitory computer-readable medium may also include code for causing the BS to scramble a cyclic redundancy check (CRC) of the PDCCH with a message B radio network temporary identifier (msgB-RNTI). The non-transitory computer-readable medium may also include code for causing the BS to include, in the scheduled PDSCH, a first RAR message type as the RAR message based on the BS detecting the preamble from message A, the first RAR message type comprising a PUSCH grant; and code for causing the BS to include, in the scheduled PDSCH, a second RAR message type as the RAR message based on the BS detecting the preamble and the payload from message A. The non-transitory computer-readable medium may also include code for causing the BS to receive the payload from the UE using the PUSCH grant based on the UE receiving the first RAR message type, wherein the RACH procedure comprises a four-step RACH procedure. The non-transitory computer-readable medium may also include code for causing the BS to re-receive the payload from the UE using the PUSCH grant based on the UE receiving the first RAR message type, wherein the RACH procedure comprises a two-step RACH procedure. The non-transitory computer-readable medium may also include code for causing the BS to include a transmission parameter into a repurposed field of the DCI separate from the configuration field. The non-transitory computer-readable medium may also include code for causing the BS to transmit the scheduled PDSCH on a time/frequency grid common to the plurality of PDSCH channels and scheduled by the PDCCH.

Further embodiments of the present disclosure include a user equipment, comprising means for receiving, by the user equipment (UE) from a base station (BS), a random access channel (RACH) response message as part of a RACH procedure; means for decoding a physical downlink control channel (PDCCH) of the RACH response message transmitted in a common search space to obtain downlink control information (DCI) from the PDCCH; means for determining a scheduled physical downlink shared channel (PDSCH) from among a plurality of PDSCH channels and a downlink modulation reference signal (DMRS) resource configuration for the UE from among a plurality of DMRS resource configurations in a configuration field of the DCI, each DMRS resource configuration corresponding to a different PDSCH channel from among the plurality of PDSCH channels; means for demodulating the scheduled PDSCH based on the DMRS resource configuration identified by the DCI; and means for decoding, based on the determining, the scheduled PDSCH identified by the DCI to obtain a random access response (RAR) message from the BS.

The user equipment may also include means for receiving, from the BS before the RACH response message, a system information message comprising a first amount corresponding to a specified number of DMRS resource configurations, and a second amount corresponding to a number of bits for each DMRS resource configuration, in the configuration field of the DCI. The user equipment may also include means for interpreting each consecutive bit in the configuration field of the DCI as a distinct flag bit for a different DMRS resource based on the second amount being less than a threshold. The user equipment may also include means for decoding each scheduled PDSCH with corresponding distinct flag asserted in the configuration field until decoding the scheduled PDSCH for the UE; and means for ignoring each PDSCH with corresponding distinct flag left unasserted in the configuration field. The user equipment may also include means for interpreting, based on the second amount being greater than a threshold, the number of bits for each DMRS resource configuration as including a first field with one or more bits comprising a flag associated with a scheduling status of a corresponding PDSCH channel; and means for interpreting a second field with one or more bits as comprising a multiple access signature for one or more UEs, including the UE, whose RAR message is associated with the corresponding PDSCH channel of each DMRS resource configuration. The user equipment may also include wherein the second field is a function of the multiple access signature, comprising one or more least significant bits of an identifier of the UE. The user equipment may also include wherein the first field comprises an aggregation pattern for a plurality of UEs including the UE receiving corresponding RAR messages in the scheduled PDSCH. The user equipment may also include wherein the scheduled PDSCH comprises a unicast RAR message for the UE, the UE further comprising means for descrambling the RAR message with a UE-specific signature. The user equipment may also include wherein the scheduled PDSCH comprises a multicast RAR message for a plurality of UEs including the UE, further comprising means for descrambling the multicast RAR message with a temporary group identifier; and means for locating the RAR message for the UE from among a plurality of UE-specific RAR messages multiplexed in the multicast RAR message. The user equipment may also include wherein the RACH procedure comprises a four-step RACH procedure and the RACH response message comprises message 2 based on the BS having received message 1 from the UE. The user equipment may also include means for descrambling a cyclic redundancy check (CRC) of the PDCCH with a random access radio network temporary identifier (RA-RNTI). The user equipment may also include wherein the RACH procedure comprises a two-step RACH procedure and the RACH response message comprises message B based on the BS having detected one or both of a preamble and a payload from message A from the UE. The user equipment may also include means for descrambling a cyclic redundancy check (CRC) of the PDCCH with a message B radio network temporary identifier (msgB-RNTI). The user equipment may also include wherein the means for decoding further comprises means for obtaining, from the scheduled PDSCH, a first RAR message type as the RAR message based on the BS detecting the preamble from message A, the first RAR message type comprising a PUSCH grant; and means for obtaining, from the scheduled PDSCH, a second RAR message type as the RAR message based on the BS detecting the preamble and the payload from message A. The user equipment may also include means for transmitting, using the PUSCH grant, the payload to the BS based on obtaining the first RAR message type, wherein the RACH procedure comprises a four-step RACH procedure. The user equipment may also include means for retransmitting, using the PUSCH grant, the payload to the BS based on obtaining the first RAR message type, wherein the RACH procedure comprises a two-step RACH procedure. The user equipment may also include means for determining a transmission parameter from a repurposed field of the DCI separate from the configuration field. The user equipment may also include wherein the means for receiving the RACH response message further comprises means for receiving the scheduled PDSCH on a time/frequency grid common to the plurality of PDSCH channels and scheduled by the PDCCH.

Further embodiments of the present disclosure include a base station, comprising means for receiving, by the base station (BS) from a user equipment (UE), a first random access channel (RACH) message as part of a RACH procedure; means for determining, in response to successfully decoding at least a portion of the first RACH message, a PDSCH channel from among a plurality of PDSCH channels and downlink modulation reference signal (DMRS) resource configuration for the UE; means for including a plurality of DMRS resource configurations including the DMRS resource configuration for the UE in a configuration field of downlink control information (DCI) in a physical downlink control channel (PDCCH), each DMRS resource configuration corresponding to a different PDSCH channel from among the plurality of PDSCH channels; means for including a random access response (RAR) message for the UE in the determined PDSCH channel; and means for transmitting, to the UE, a second RACH message as part of the RACH procedure, the second RACH message comprising the PDCCH and the determined PDSCH channel scheduled by the PDCCH.

The base station may also include wherein the means for determining further comprises means for determining a type for the RAR message, a multiplexing pattern with multiple UEs including the UE, a scrambling identifier for the RAR message; and means for scrambling the determined PDSCH channel with the scrambling identifier. The base station may also include wherein the scheduled PDSCH is on a time/ frequency grid common to the plurality of PDSCH channels and scheduled by the PDCCH. The base station may also include means for sending, before the first RACH message, a system information message comprising a first amount corresponding to a specified number of DMRS resource configurations, and a second amount corresponding to a number of bits for each DMRS resource configuration, in the configuration field of the DCI. The base station may also include means for configuring each consecutive bit in the configuration field as a distinct flag for a different DMRS resource based on the second amount being set to less than a threshold. The base station may also include means for configuring, based on the second amount being greater than a threshold, the number of bits for each DMRS resource configuration to include a first field with one or more bits comprising a flag associated with a scheduling state of a corresponding PDSCH channel; and means for configuring a second field to include one or more bits comprising a multiple access signature for one or more UEs, including the UE, whose RAR message is associated with the corresponding PDSCH channel of each DMRS resource configuration. The base station may also include wherein the second field is a function of the multiple access signature, comprising one or more least significant bits of an identifier of the UE. The base station may also include wherein the first field comprises an aggregation pattern for a plurality of UEs including the UE receiving corresponding RAR messages in the scheduled PDSCH. The base station may also include wherein the scheduled PDSCH comprises a unicast RAR message for the UE, further comprising means for scrambling the RAR message with a UE-specific signature. The base station may also include wherein the scheduled PDSCH comprises a multicast RAR message for a plurality of UEs including the UE, further comprising means for placing the RAR message for the UE within a plurality of UE-specific RAR messages multiplexed in the multicast RAR message; and means for scrambling the multicast RAR message with a temporary group identifier. The base station may also include wherein the RACH procedure comprises a four-step RACH procedure and the RACH response message comprises message 2 based on the BS having received message 1 from the UE. The base station may also include means for scrambling a cyclic redundancy check (CRC) of the PDCCH with a random access radio network temporary identifier (RA-RNTI). The base station may also include wherein the RACH procedure comprises a two-step RACH procedure and the RACH response message comprises message B based on the BS having detected one or both of a preamble and a payload from message A from the UE. The base station may also include means for scrambling a cyclic redundancy check (CRC) of the PDCCH with a message B radio network temporary identifier (msgB-RNTI). The base station may also include means for including, in the scheduled PDSCH, a first RAR message type as the RAR message based on the BS detecting the preamble from message A, the first RAR message type comprising a PUSCH grant; and means for including, in the scheduled PDSCH, a second RAR message type as the RAR message based on the BS detecting the preamble and the payload from message A. The base station may also include means for receiving the payload from the UE using the PUSCH grant based on the UE receiving the first RAR message type, wherein the RACH procedure comprises a four-step RACH procedure. The base station may also include means for re-receiving the payload from the UE using the PUSCH grant based on the UE receiving the first RAR message type, wherein the RACH procedure comprises a two-step RACH procedure. The base station may also include means for including a transmission parameter into a repurposed field of the DCI separate from the configuration field. The base station may also include means for transmitting the scheduled PDSCH on a time/frequency grid common to the plurality of PDSCH channels and scheduled by the PDCCH.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving, from a base station (BS), a random access channel (RACH) response message as part of a RACH procedure;
   decoding a physical downlink control channel (PDCCH) in the RACH response message transmitted in a common search space to obtain downlink control information (DCI) from the PDCCH;
   determining a scheduled physical downlink shared channel (PDSCH) from among a plurality of PDSCH channels in the DCI and a downlink modulation reference signal (DMRS) resource configuration for the UE from among a plurality of DMRS resource configurations in a configuration field of the DCI, each DMRS resource configuration corresponding to a different PDSCH channel from among the plurality of PDSCH channels;
   demodulating the scheduled PDSCH based on the DMRS resource configuration identified by the DCI; and
   decoding, based on the determining, each scheduled PDSCH with a corresponding distinct flag asserted in the configuration field of the DCI until decoding the scheduled PDSCH for the UE to obtain a random access response (RAR) message from the BS.

2. The method of claim 1, further comprising:
   interpreting each consecutive bit in the configuration field of the DCI as a distinct flag bit for a different DMRS resource based on a system information message from the BS before the RACH response message indicating information about the configuration field of the DCI; and
   ignoring each PDSCH with a corresponding distinct flag left unasserted in the configuration field of the DCI.

3. The method of claim 1, wherein the scheduled PDSCH comprises a unicast RAR message for the UE, the method further comprising:
   descrambling the RAR message with a UE-specific signature.

4. The method of claim 1, wherein the scheduled PDSCH comprises a multicast RAR message for a plurality of UEs including the UE, the method further comprising:
   descrambling the multicast RAR message with a temporary group identifier; and
   locating the RAR message for the UE from among a plurality of UE-specific RAR messages multiplexed in the multicast RAR message.

5. The method of claim 1, wherein the RACH procedure comprises a two-step RACH procedure and the RACH response message comprises message B based on the BS having detected one or both of a preamble and a payload from message A from the UE.

6. The method of claim 5, further comprising:
descrambling a cyclic redundancy check (CRC) of the PDCCH with a message B radio network temporary identifier (msgB-RNTI).

7. The method of claim 5, wherein the decoding further comprises:
obtaining, from the scheduled PDSCH, a first RAR message type as the RAR message based on the BS detecting the preamble from message A, the first RAR message type comprising a PUSCH grant; and
obtaining, from the scheduled PDSCH, a second RAR message type as the RAR message based on the BS detecting the preamble and the payload from message A.

8. The method of claim 7, further comprising:
retransmitting, using the PUSCH grant, the payload to the BS based on obtaining the first RAR message type, wherein the RACH procedure comprises a two-step RACH procedure.

9. A method of wireless communication performed by a base station (BS), the method comprising:
receiving, from a user equipment (UE), a first random access channel (RACH) message as part of a RACH procedure;
determining, in response to successfully decoding at least a portion of the first RACH message, a PDSCH channel from among a plurality of PDSCH channels and downlink modulation reference signal (DMRS) resource configuration for the UE;
including a plurality of DMRS resource configurations including the DMRS resource configuration for the UE in downlink control information (DCI) in a physical downlink control channel (PDCCH), each DMRS resource configuration corresponding to a different PDSCH channel from among the plurality of PDSCH channels;
configuring each consecutive bit in a configuration field of the DCI as a distinct flag for a different DMRS resource;
including a random access response (RAR) message for the UE in the determined PDSCH channel; and
transmitting, to the UE, a second RACH message as part of the RACH procedure, the second RACH message comprising the PDCCH and the determined PDSCH channel scheduled by the PDCCH.

10. The method of claim 9, wherein the scheduled PDSCH comprises a unicast RAR message for the UE, the method further comprising:
scrambling the RAR message with a UE-specific signature.

11. The method of claim 9, wherein the scheduled PDSCH comprises a multicast RAR message for a plurality of UEs including the UE, the method further comprising:
placing the RAR message for the UE within a plurality of UE-specific RAR messages multiplexed in the multicast RAR message; and
scrambling the multicast RAR message with a temporary group identifier.

12. The method of claim 9, wherein the RACH procedure comprises a two-step RACH procedure and the RAR response message comprises message B based on the BS having detected one or both of a preamble and a payload from message A from the UE, the method further comprising:

scrambling a cyclic redundancy check (CRC) of the PDCCH with a message B radio network temporary identifier (msgB-RNTI).

13. The method of claim 12, further comprising:
including, in the scheduled PDSCH, a first RAR message type as the RAR message based on the BS detecting the preamble from message A, the first RAR message type comprising a PUSCH grant; and
including, in the scheduled PDSCH, a second RAR message type as the RAR message based on the BS detecting the preamble and the payload from message A.

14. The method of claim 13, further comprising:
re-receiving the payload from the UE using the PUSCH grant based on the UE receiving the first RAR message type, wherein the RACH procedure comprises a two-step RACH procedure.

15. A user equipment, comprising:
a memory;
a transceiver; and
at least one processor coupled to the memory and the transceiver, wherein the user equipment is configured to:
receive, from a base station (BS), a random access channel (RACH) response message as part of a RACH procedure;
decode a physical downlink control channel (PDCCH) in the RACH response message transmitted in a common search space to obtain downlink control information (DCI) from the PDCCH;
determine a scheduled physical downlink shared channel (PDSCH) from among a plurality of PDSCH channels in the DCI and a downlink modulation reference signal (DMRS) resource configuration for the user equipment from among a plurality of DMRS resource configurations in a configuration field of the DCI, each DMRS resource configuration corresponding to a different PDSCH channel from among the plurality of PDSCH channels;
demodulate the scheduled PDSCH based on the DMRS resource configuration identified by the DCI; and
decode, based on the determining, each scheduled PDSCH with a corresponding distinct flag asserted in the configuration field of the DCI until decoding the scheduled PDSCH for the UE to obtain a random access response (RAR) message from the BS.

16. The user equipment of claim 15, wherein the user equipment is further configured to:
interpret each consecutive bit in the configuration field of the DCI as a distinct flag bit for a different DMRS resource based on a system information message from the BS before the RACH response message indicating information about the configuration field of the DCI; and
ignore each PDSCH with a corresponding distinct flag left unasserted in the configuration field of the DCI.

17. The user equipment of claim 15, wherein the scheduled PDSCH comprises a unicast RAR message for the user equipment, the user equipment being further configured to:
descramble the RAR message with a user equipment-specific signature.

18. The user equipment of claim 15, wherein the scheduled PDSCH comprises a multicast RAR message for a plurality of user equipment including the user equipment, the user equipment being further configured to:
descramble the multicast RAR message with a temporary group identifier; and locate the RAR message for the user equipment from among a plurality of user equipment-specific RAR messages multiplexed in the multicast RAR message.

19. The user equipment of claim 15, wherein the RACH procedure comprises a two-step RACH procedure and the RACH response message comprises message B based on the BS having detected one or both of a preamble and a payload from message A from the user equipment.

20. The user equipment of claim 19, wherein the user equipment is further configured to:
descramble a cyclic redundancy check (CRC) of the PDCCH with a message B radio network temporary identifier (msgB-RNTI).

21. The user equipment of claim 19, wherein the user equipment is further configured to:
obtain, from the scheduled PDSCH, a first RAR message type as the RAR message based on the BS detecting the preamble from message A, the first RAR message type comprising a PUSCH grant; and
obtain, from the scheduled PDSCH, a second RAR message type as the RAR message based on the BS detecting the preamble and the payload from message A.

22. The user equipment of claim 21, wherein the user equipment is further configured to:
retransmit, using the PUSCH grant, the payload to the BS based on obtaining the first RAR message type, wherein the RACH procedure comprises a two-step RACH procedure.

23. A base station, comprising:
a memory;
a transceiver; and
at least one processor coupled to the memory and the transceiver, wherein the base station is configured to:
receive, from a user equipment (UE), a first random access channel (RACH) message as part of a RACH procedure;
determine, in response to successfully decoding at least a portion of the first RACH message, a PDSCH channel from among a plurality of PDSCH channels and downlink modulation reference signal (DMRS) resource configuration for the UE;
include a plurality of DMRS resource configurations including the DMRS resource configuration for the UE in downlink control information (DCI) in a physical downlink control channel (PDCCH), each DMRS resource configuration corresponding to a different PDSCH channel from among the plurality of PDSCH channels;

configure each consecutive bit in a configuration field of the DCI as a distinct flag for a different DMRS resource;
include a random access response (RAR) message for the UE in the determined PDSCH channel; and
transmit, to the UE, a second RACH message as part of the RACH procedure, the second RACH message comprising the PDCCH and the determined PDSCH channel scheduled by the PDCCH.

24. The base station of claim 23, wherein the scheduled PDSCH comprises a unicast RAR message for the UE, wherein the base station is further configured to:
scramble the RAR message with a UE-specific signature.

25. The base station of claim 23, wherein the scheduled PDSCH comprises a multicast RAR message for a plurality of UEs including the UE, wherein the base station is further configured to:
place the RAR message for the UE within a plurality of UE-specific RAR messages multiplexed in the multicast RAR message; and
scramble the multicast RAR message with a temporary group identifier.

26. The base station of claim 23, wherein the RACH procedure comprises a two-step RACH procedure and the RAR response message comprises message B based on the base station having detected one or both of a preamble and a payload from message A from the UE, the base station being further configured to:
scramble a cyclic redundancy check (CRC) of the PDCCH with a message B radio network temporary identifier (msgB-RNTI).

27. The base station of claim 26, wherein the base station is further configured to:
include, in the scheduled PDSCH, a first RAR message type as the RAR message based on the base station detecting the preamble from message A, the first RAR message type comprising a PUSCH grant; and
include, in the scheduled PDSCH, a second RAR message type as the RAR message based on the base station detecting the preamble and the payload from message A.

28. The base station of claim 27, wherein the base station is further configured to:
re-receive the payload from the UE using the PUSCH grant based on the UE receiving the first RAR message type, wherein the RACH procedure comprises a two-step RACH procedure.

* * * * *